US010880747B2

(12) United States Patent
Hu et al.

(10) Patent No.: US 10,880,747 B2
(45) Date of Patent: Dec. 29, 2020

(54) NETWORK SLICE ALLOCATION METHOD, DEVICE, AND SYSTEM

(71) Applicant: Huawei International Pte. Ltd., Singapore (SG)

(72) Inventors: Hao Hu, Singapore (SG); Zhongding Lei, Singapore (SG); Lichun Li, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/730,780

(22) Filed: Dec. 30, 2019

(65) Prior Publication Data

US 2020/0137576 A1 Apr. 30, 2020

Related U.S. Application Data

(63) Continuation of application No. PCT/SG2017/050327, filed on Jun. 29, 2017.

(51) Int. Cl.
*H04W 12/08* (2009.01)
*H04L 9/30* (2006.01)
(Continued)

(52) U.S. Cl.
CPC ............ *H04W 12/08* (2013.01); *H04W 12/10* (2013.01); *H04W 72/04* (2013.01); *H04L 9/30* (2013.01)

(58) Field of Classification Search
CPC ........ H04L 9/30; H04L 63/0414; H04L 29/06; H04W 12/08; H04W 12/00518;
(Continued)

(56) References Cited

U.S. PATENT DOCUMENTS 8,880,880 B2 11/2014 Mao et al.
10,142,994 B2 * 11/2018 Lee .................. H04W 28/16
(Continued)

FOREIGN PATENT DOCUMENTS

CN 102624917 A 8/2012
CN 104778422 A 7/2015
(Continued)

OTHER PUBLICATIONS

"TS 23.501:Privacy considerations for network slicing," SA WG2 Meeting #S2-122, San Jose Del Cabo, Mexico, S2-174454,XP051303302, pp. 1-8, 3rd Generation Partnership Project, Valbonne, France (Jun. 26-30, 2017).
(Continued)

*Primary Examiner* — Nathan S Taylor
(74) *Attorney, Agent, or Firm* — Leydig, Voit & Mayer, Ltd.

(57) ABSTRACT

This application provides a network slice allocation method, device, and system, including a terminal device, a first core network device, a second core network device, and a third core network device. The terminal device encrypts NSSAI and an ID of the terminal device to obtain encrypted information, and sends a slice access request message to the first core network device. The first core network device sends the encrypted information to the second core network device. The second core network device decrypts the encrypted information to obtain the NSSAI and the ID of the terminal device, generates an authentication vector, and sends the NSSAI and the authentication vector to the first core network device.

13 Claims, 9 Drawing Sheets

(51) Int. Cl.
*H04W 12/10* (2009.01)
*H04W 72/04* (2009.01)

(58) Field of Classification Search
CPC ..... H04W 12/10; H04W 48/18; H04W 72/04; H04W 8/065; H04W 8/18; H04W 8/24; H04W 12/00
See application file for complete search history.

(56) References Cited

U.S. PATENT DOCUMENTS

| | | | |
|---|---|---|---|
| 2018/0192445 A1 | 7/2018 | Jiang | |
| 2018/0270666 A1* | 9/2018 | Lee | H04W 12/0804 |
| 2019/0029065 A1* | 1/2019 | Park | H04W 60/00 |
| 2019/0053288 A1* | 2/2019 | Zhou | H04B 7/0695 |
| 2019/0150081 A1* | 5/2019 | Qiao | H04W 60/005 370/329 |
| 2019/0174405 A1* | 6/2019 | Yang | H04L 41/042 |
| 2019/0230584 A1 | 7/2019 | Lou et al. | |
| 2019/0342821 A1* | 11/2019 | Kim | H04L 47/745 |
| 2019/0364495 A1* | 11/2019 | Mildh | H04W 60/00 |
| 2019/0373520 A1* | 12/2019 | Sillanpaa | H04W 36/14 |
| 2019/0394624 A1* | 12/2019 | Karampatsis | H04W 76/14 |
| 2020/0015066 A1* | 1/2020 | Zhu | H04W 48/18 |
| 2020/0015158 A1* | 1/2020 | So | H04W 48/16 |
| 2020/0037386 A1* | 1/2020 | Park | H04W 76/18 |
| 2020/0100101 A1* | 3/2020 | Torvinen | H04L 63/0428 |
| 2020/0163010 A1* | 5/2020 | Qiao | H04W 8/08 |
| 2020/0163145 A1* | 5/2020 | Park | H04W 76/25 |

FOREIGN PATENT DOCUMENTS

| | | |
|---|---|---|
| CN | 106572516 A | 4/2017 |
| CN | 106851589 A | 6/2017 |

OTHER PUBLICATIONS

"Security for UE connecting to multiple Slice," 3GPP TSG SA WG2 Meeting #116, Vienna, Austria, S2-163599 (revision of S2-16xxxx), pp. 1-11, 3rd Generation Partnership Project, Valbonne, France (Jul. 11-15, 2016).
"3rd Generation Partnership Project; Technical Specification Group Services and System Aspects; System Architecture for the 5G System; Stage 2 (Release 15)," 3GPP TS 23.501 V0.3.0, pp. 1-97, 3rd Generation Partnership Project, Valbonne, France (Feb. 2017).
"Way forward for change of AMF / Control of N2 persistence," SA WG2 Meeting #119, Dubrovnik, Croatia, S2-171485 (was S2-17xxxx), XP051240721, pp. 1-7, 3rd Generation Partnership Project, Valbonne, France (Feb. 13-17, 2017).
"Solution for selection of a network slice instance," SA WG2 Meeting #116, Vienna, AT, S2-164258 (revision of S2-163978), pp. 1-5, 3rd Generation Partnership Project, Valbonne, France (Jul. 11-15, 2016).
"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).
"3rd Generation Partnership Project; Technical Specification Group Services and System Aspects; System Architecture for the 5G System; Stage 2 (Release 15)," 3GPP TS 23.501 V1.0.0, XP055569013, pp. 1-146, 3rd Generation Partnership Project, Valbonne, France (Jun. 2017).
"Way forward w/ NSSAI," SA WG2 Meeting #119, Dubrovnik, HR, S2-170812 (was S2-17xxxx), pp. 1-10, 3rd Generation Partnership Project, Valbonne, France (Feb. 13-17, 2017).
"3rd Generation Partnership Project; Technical Specification Group Services and System Aspects; 3GPP System Architecture Evolution (SAE); Security architecture (Release 15)," 3GPP TS 33.401 V15.0.0, pp. 1-153, 3rd Generation Partnership Project, Valbonne, France (Jun. 2017).
"3rd Generation Partnership Project;Technical Specification Group Services and System Aspects; Procedures for the 5G System; Stage 2 (Release 15)," 3GPP TS 23.502 V0.4.0, XP051298344, pp. 1-126, 3rd Generation Partnership Project, Valbonne, France (May 2017).
"3rd Generation Partnership Project; Technical Specification Group Services and System Aspects; Study on the security aspects of the next generation system (Release 14)," 3GPP TR 33.899 V1.2.0, pp. 1-586, 3rd Generation Partnership Project, Valbonne, France (Jun. 2017).
"3rd Generation Partnership Project;Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-720, 3rd Generation Partnership Project, Valbonne, France (Apr. 2017).
"LS to SA WG3 on privacy of registration and slice selection information," SA WG2 Meeting #S2-118BIS, Spokane, Washington, USA, S2-170687, pp. 1-2, 3rd Generation Partnership Project, Valbonne, France (Jan. 16-20, 2017).
"Reply LS on privacy of registration and slice selection information," SA WG2 Meeting #S2-120, Busan, South Korea, S2-172650, pp. 1-2, 3rd Generation Partnership Project, Valbonne, France (Mar. 27-31, 2017).
"LS to SA WG3 on privacy of registration and slice selection information," 3GPP TSG SA WG3 (Security) Meeting #86Bis, Busan, Korea, S3-170604 (revision of S3-17xabc), pp. 1-2, 3rd Generation Partnership Project, Valbonne, France (Mar. 27-31, 2017).
"Privacy and security of registration and slice selection information," 3GPP TSG SA WG3 (Security) Meeting #86Bis, Busan, Korea, S3-170845 (revision of S3-17xabc), pp. 1-2, 3rd Generation Partnership Project, Valbonne, France (Mar. 27-31, 2017).

* cited by examiner

NETWORK SLICE ALLOCATION METHOD, DEVICE, AND SYSTEM

CROSS-REFERENCE TO RELATED APPLICATIONS

This application is a continuation of International Application No. PCT/SG2017/050327, filed on Jun. 29, 2017. The disclosure of which is hereby incorporated by reference in its entirety.

TECHNICAL FIELD

This application relates to the field of communications technologies, and in particular, to a network slice allocation method, device, and system.

BACKGROUND

Network slicing is an important technology in the 5th-generation mobile communications technology (5G) and a future communications network. The network slicing has a feature of service-oriented configuration, and will become a key driving force for future network development. For example, a new service can be rapidly launched based on the network slicing technology.

Currently, when a terminal device requests to access a network slice, the terminal device needs to send a slice access request message (which may also be referred to as a registration request message) to a base station. The slice access request message includes network slice selection assistance information (NSSAI), the NSSAI includes a slice service type (SST), the SST is used to indicate a type of the network slice, and network slices corresponding to all types provide different services for the terminal device. Further, the NSSAI further includes slice differentiator information (SD), and the SD is used to indicate an instance in which a slice is selected based on the type of the network slice. The base station selects an access and mobility management function (AMF) entity for the terminal device based on the slice access request message. Then, the AMF entity allocates the network slice to the terminal device based on the NSSAI.

In the prior art, NSSAI included in a slice access request message is NSSAI in a plaintext form. This causes security risks to a network communications system. For example, an eavesdropper may determine, by intercepting NSSAI, whether a police office exists in an area. Alternatively, the eavesdropper may infer a recent behavior of a terminal device based on an SST. Therefore, how to reduce the security risks to the network communications system becomes an urgent problem to be resolved.

SUMMARY

This application provides a network slice allocation method, device, and system, to reduce security risks to a network communications system.

According to a first aspect, this application provides a network slice allocation system, including: a terminal device, a first core network device, a second core network device, and a third core network device. The terminal device is configured to: encrypt slice selection assistance information NSSAI and an identity of the terminal device by using a public key of a home network, to obtain encrypted information, and send a slice access request message to the first core network device, where the slice access request message includes the encrypted information. The first core network device is configured to send the encrypted information to the second core network device. The second core network device is configured to: decrypt the encrypted information by using a private key of the home network, to obtain the NSSAI and the identity of the terminal device, generate an authentication vector based on the identity of the terminal device, and send the NSSAI and the authentication vector to the first core network device. The first core network device is further configured to determine the third core network device based on the NSSAI; when the first core network device determines that the first core network device is different from the third core network device, the first core network device is further configured to send the slice access request message, the NSSAI, and the authentication vector to the third core network device; and the third core network device is configured to allocate a network slice to the terminal device based on the slice access request message, the NSSAI, and the authentication vector.

Beneficial effects of embodiments of this application are as follows: The terminal device does not directly send the NSSAI to the core network device, but uses an encryption technology for the NSSAI and the ID of the terminal device, to obtain the encrypted information, and sends the encrypted information to the first core network device. In this way, security risks in a network communications system can be reduced. In addition, because the first core network device cannot learn of the NSSAI, the first core network device sends the encrypted information to the second core network device to decrypt the encrypted information by using the private key of the home network, to obtain the NSSAI. Based on this, the second core network device sends the NSSAI to the first core network device. Based on this, a core network side has obtained the NSSAI, so that the core network side can allocate a network slice to the terminal device. Therefore, the network slice allocation system in this application can allocate a network slice to the terminal device, and can reduce the security risks to the network communications system.

Optionally, both the first core network device and the third core network device are access and mobility management function AMF entities, and the second core network device is a unified data management UDM entity of the home network.

The following describes the network slice allocation method performed by each device in the foregoing system. An implementation principle and technical effects of the network slice allocation method are similar to the foregoing principle and technical effects, and details are not repeated herein.

According to a second aspect, this application provides a network slice allocation method, including: receiving, by a first core network device, a slice access request message sent by a terminal device, where the slice access request message includes encrypted information, and the encrypted information is information obtained by the terminal device by encrypting slice selection assistance information NSSAI and an identity of the terminal device by using a public key of a home network; sending, by the first core network device, the encrypted information to a second core network device; receiving, by the first core network device, the NSSAI and an authentication vector corresponding to the terminal device that are sent by the second core network device, where the NSSAI is obtained by the second core network device by decrypting the encrypted information by using a private key of the home network; determining, by the first core network device based on the NSSAI, a third core network device, where the third core network device is a core network device that allocates a network slice to the terminal device; and when the first core network device determines that the first core network device is different from the third core network device, sending, by the first core network device, the slice access request message, the NSSAI, and the authentication vector to the third core network device, to enable the third core network device to allocate the network slice to the terminal device based on the slice access request message, the NSSAI, and the authentication vector.

According to a third aspect, this application provides a network slice allocation method, including: receiving, by a second core network device, encrypted information sent by a first core network device, where the encrypted information is information obtained by a terminal device by encrypting slice selection assistance information NSSAI and an identity of the terminal device by using a public key of a home network; decrypting, by the second core network device, the encrypted information by using a private key of the home network, to obtain the NSSAI and the identity of the terminal device, and generating an authentication vector based on the identity of the terminal device; and sending, by the second core network device, the NSSAI and the authentication vector to the first core network device.

According to a fourth aspect, this application provides a network slice allocation method, including: encrypting, by a terminal device, slice selection assistance information NSSAI and an identity of the terminal device by using a public key of a home network, to obtain encrypted information; and sending, by the terminal device, a slice access request message to a first core network device, where the slice access request message includes the encrypted information.

The following describes each device in the foregoing system. An implementation principle and technical effects of the network slice allocation method are similar to the foregoing principle and technical effects, and details are not repeated herein.

According to a fifth aspect, this application provides a network slice allocation device, including: a receiver, a processor, a transmitter, and a memory. The receiver is configured to receive a slice access request message sent by a terminal device, where the slice access request message includes encrypted information, and the encrypted information is information obtained by the terminal device by encrypting slice selection assistance information NSSAI and an identity of the terminal device by using a public key of a home network; the transmitter is configured to send the encrypted information to a second core network device; the receiver is further configured to receive the NSSAI and an authentication vector corresponding to the terminal device that are sent by the second core network device, where the NSSAI is obtained by the second core network device by decrypting the encrypted information by using a private key of the home network; the memory is configured to store code, and when the code is run by the processor, the processor is configured to determine a third core network device based on the NSSAI, where the third core network device is a core network device that allocates a network slice to the terminal device; and the transmitter is configured to: when the processor determines that the network slice allocation device is different from the third core network device, send the slice access request message, the NSSAI, and the authentication vector to the third core network device, to enable the third core network device to allocate the network slice to the terminal device based on the slice access request message, the NSSAI, and the authentication vector.

According to a sixth aspect, this application provides a network slice allocation device, including: a receiver, a processor, a transmitter, and a memory. The receiver is configured to receive encrypted information sent by a first core network device, where the encrypted information is information obtained by a terminal device by encrypting slice selection assistance information NSSAI and an identity of the terminal device by using a public key of a home network; the memory is configured to store code, and when the code is run by the processor, the processor is configured to: decrypt the encrypted information by using a private key of the home network, to obtain the NSSAI and the identity of the terminal device, and generate an authentication vector based on the identity of the terminal device; and the transmitter is configured to send the NSSAI and the authentication vector to the first core network device.

According to a seventh aspect, this application provides a network slice allocation device, including: a processor, a memory, and a transmitter. The memory is configured to store code, and when the code is run by the processor, the processor is configured to encrypt slice selection assistance information NSSAI and an identity of the network slice allocation device by using a public key of a home network, to obtain encrypted information; and the transmitter is configured to send a slice access request message to a first core network device, where the slice access request message includes the encrypted information.

According to an eighth aspect, this application provides a network slice allocation system, including: a terminal device, an access network device, and at least one first core network device, where the at least one first core network device includes a second core network device. The access network device is configured to broadcast at least one first mapping relationship, where each first mapping relationship is a mapping relationship between one first pseudo identity and at least one piece of first slice selection assistance information NSSAI, and the first pseudo identity is a pseudo identity of a first core network device; the terminal device is configured to: determine a second pseudo identity based on second NSSAI and the at least one first mapping relationship, and send a slice access request message to the access network device, where the slice access request message includes the second pseudo identity; the access network device is further configured to: determine a second core network device corresponding to the second pseudo identity, and send the slice access request message to the second core network device; and the second core network device is configured to: send a security mode command to the terminal device, receive a security mode complete command sent by the terminal device, receive the second NSSAI sent by the terminal device based on the security mode command, and allocate a network slice to the terminal device based on the slice access request message and the second NSSAI.

Beneficial effects of the embodiments of this application are as follows: The terminal device does not directly send the NSSAI to the core network device, but sends the second pseudo ID to the access network device, and the access network device determines, based on the second pseudo ID, that the second core network device sends the slice access request message. Then, a secure channel is established between the terminal device and the second core network device, and the terminal device sends the second NSSAI to the second core network device through the secure channel. In other words, sending the second NSSAI through the secure channel can reduce security risks to a network communications system.

Optionally, when the terminal device is in a visited network, the at least one piece of first NSSAI is at least one piece of NSSAI in the visited network, and the second NSSAI is NSSAI in a home network of the terminal device. The terminal device is further configured to obtain at least one second mapping relationship, where each second mapping relationship is a correspondence between one piece of first NSSAI and one piece of third NSSAI, and the third NSSAI is NSSAI in the home network of the terminal device. Correspondingly, the terminal device is specifically configured to: determine fourth NSSAI based on the second NSSAI and the at least one second mapping relationship, and determine the second pseudo identity based on the fourth NSSAI and the at least one first mapping relationship, where the fourth NSSAI is one of the at least one piece of first NSSAI.

Based on the foregoing, when the terminal device is in the visited network, the network slice allocation system may effectively determine the second pseudo ID based on the second NSSAI, the at least one first mapping relationship, and the at least one second mapping relationship.

Optionally, a priority of the first core network device is higher than a first preset threshold, or a priority of each piece of first NSSAI is higher than a second preset threshold, so that the system can reduce signaling overheads.

Optionally, the at least one first mapping relationship is carried in a system information block SIB, so that the system can reduce signaling overheads.

The following describes the network slice allocation method performed by each device in the foregoing system. An implementation principle and technical effects of the network slice allocation method are similar to the foregoing principle and technical effects, and details are not repeated herein.

According to a ninth aspect, this application provides a network slice allocation method, including: broadcasting, by an access network device, at least one first mapping relationship, where each first mapping relationship is a mapping relationship between one first pseudo identity and at least one piece of first slice selection assistance information NSSAI, and the first pseudo identity is a pseudo identity of a first core network device; receiving, by the access network device, a slice access request message sent by a terminal device, where the slice access request message includes a second pseudo identity, and the second pseudo identity is a pseudo identity determined by the terminal device based on second NSSAI and the at least one first mapping relationship; determining, by the access network device, a second core network device corresponding to the second pseudo identity; and sending, by the access network device, the slice access request message to the second core network device.

According to a tenth aspect, this application provides a network slice allocation method, including: receiving, by a terminal device, at least one first mapping relationship, where each first mapping relationship is a mapping relationship between one first pseudo identity and at least one piece of first slice selection assistance information NSSAI, and the first pseudo identity is a pseudo identity of a first core network device; determining, by the terminal device, a second pseudo identity based on second NSSAI and the at least one first mapping relationship, where the second pseudo identity is a pseudo identity of a second core network device; sending, by the terminal device, a slice access request message to an access network device, where the slice access request message includes the second pseudo identity; receiving, by the terminal device, a security mode command sent by the second core network device; sending, by the terminal device, a security mode complete command to the second core network device; and sending, by the terminal device, the second NSSAI to the second core network device based on the security mode command.

Optionally, when the terminal device is in a visited network, the at least one piece of first NSSAI is at least one piece of NSSAI in the visited network; and the second NSSAI is NSSAI in a home network of the terminal device, and before the determining, by the terminal device, a second pseudo identity based on second NSSAI and the at least one first mapping relationship, the method further includes: obtaining, by the terminal device, at least one second mapping relationship, where each second mapping relationship is a correspondence between one piece of first NSSAI and one piece of third NSSAI, and the third NSSAI is NSSAI in the home network of the terminal device; correspondingly, the determining, by the terminal device, a second pseudo identity based on second NSSAI and the at least one first mapping relationship includes: determining, by the terminal device, fourth NSSAI based on the second NSSAI and the at least one second mapping relationship, where the fourth NSSAI is one of the at least one piece of first NSSAI; and determining, by the terminal device, the second pseudo identity based on the fourth NSSAI and the at least one first mapping relationship.

The following describes each device in the foregoing system. An implementation principle and technical effects of the devices are similar to the foregoing principle and technical effects, and details are not repeated herein.

According to an eleventh aspect, this application provides a network slice allocation device, including: a transmitter, a receiver, a processor, and a memory. The transmitter is configured to broadcast at least one first mapping relationship, where each first mapping relationship is a mapping relationship between one first pseudo identity and at least one piece of first slice selection assistance information NSSAI, and the first pseudo identity is a pseudo identity of a first core network device; the receiver is configured to receive a slice access request message sent by a terminal device, where the slice access request message includes a second pseudo identity, and the second pseudo identity is a pseudo identity determined by the terminal device based on second NSSAI and the at least one first mapping relationship; the memory is configured to store code, and when the code is run by the processor, the processor is configured to determine a second core network device corresponding to the second pseudo identity; and the transmitter is configured to send the slice access request message to the second core network device.

According to a twelfth aspect, this application provides a network slice allocation device, including: a transmitter, a receiver, a processor, and a memory. The receiver is configured to receive at least one first mapping relationship, where each first mapping relationship is a mapping relationship between one first pseudo identity and at least one piece of first slice selection assistance information NSSAI, and the first pseudo identity is a pseudo identity of a first core network device; the memory is configured to store code, and when the code is run by the processor, the processor is configured to determine a second pseudo identity based on second NSSAI and the at least one first mapping relationship, where the second pseudo identity is a pseudo identity of a second core network device; the transmitter is configured to send a slice access request message to an access network device, where the slice access request message includes the second pseudo identity. The receiver is further configured to receive a security mode command sent by the second core network device; the transmitter is further configured to send a security mode complete command to the second core network device; and the transmitter is further configured to send the second NSSAI to the second core network device based on the security mode command.

Optionally, when the network slice allocation device is in a visited network, the at least one piece of first NSSAI is at least one piece of NSSAI in the visited network, and the second NSSAI is NSSAI in a home network of a terminal device; the receiver is further configured to obtain at least one second mapping relationship, where each second mapping relationship is a correspondence between one piece of first NSSAI and one piece of third NSSAI, and the third NSSAI is NSSAI in a home network of the network slice allocation device; and the processor is specifically configured to: determine fourth NSSAI based on the second NSSAI and the at least one second mapping relationship, where the fourth NSSAI is one of the at least one piece of first NSSAI; and determine the second pseudo identity based on the fourth NSSAI and the at least one first mapping relationship.

According to a thirteenth aspect, this application provides a network slice allocation system, including: a terminal device, an access network device, and at least one first core network device, where the at least one first core network device includes a second core network device. The terminal device is configured to receive at least one first pseudo identity sent by the access network device, where each first pseudo identity is a pseudo identity of a first core network device, and the first core network device is a core network device that previously allocated a network slice to the terminal device; the terminal device is further configured to: establish a mapping relationship between each first pseudo identity and at least one piece of first slice selection assistance information NSSAI, determine a second pseudo identity based on the mapping relationship and second NSSAI, and send a slice access request message to the access network device, where the slice access request message includes the second pseudo identity, and the second pseudo identity is one of the at least one first pseudo identity; the access network device is configured to: determine a second core network device corresponding to the second pseudo identity, and send the slice access request message to the second core network device; and the second core network device is configured to: send a security mode command to the terminal device, receive a security mode complete command sent by the terminal device, receive the second NSSAI sent by the terminal device based on the security mode command, and allocate a network slice to the terminal device based on the slice access request message and the second NSSAI.

Beneficial effects of the embodiments of this application are as follows: The terminal device does not directly send the NSSAI to the core network device, but sends the second pseudo ID to the access network device, and the access network device determines, based on the second pseudo ID, that the second core network device sends the slice access request message. Then, a secure channel is established between the terminal device and the second core network device, and the terminal device sends the second NSSAI to the second core network device through the secure channel. In other words, sending the second NSSAI through the secure channel can reduce security risks to a network communications system.

Optionally, the at least one first pseudo identity is generated by the access network device or any first core network device.

The following describes the network slice allocation method performed by each device in the foregoing system. An implementation principle and technical effects of the network slice allocation method are similar to the foregoing principle and technical effects, and details are not repeated herein.

According to a fourteenth aspect, this application provides a network slice allocation method, including: sending, by an access network device, at least one first pseudo identity to a terminal device, where each first pseudo identity is a pseudo identity of a first core network device, and the first core network device is a core network device that previously allocated a network slice to the terminal device; receiving, by the access network device, a slice access request message sent by the terminal device, where the slice access request message includes a second pseudo identity, and the second pseudo identity is one of the at least one first pseudo identity; determining, by the access network device, a second core network device corresponding to the second pseudo identity; and sending, by the access network device, the slice access request message to the second core network device.

According to a fifteenth aspect, this application provides a network slice allocation method, including: receiving, by a terminal device, at least one first pseudo identity sent by an access network device, where each first pseudo identity is a pseudo identity of a first core network device, and the first core network device is a core network device that previously allocated a network slice to the terminal device; establishing, by the terminal device, a mapping relationship between each first pseudo identity and at least one piece of first slice selection assistance information NSSAI; determining, by the terminal device, a second pseudo identity based on the mapping relationship and second NSSAI, where the second pseudo identity is one of the at least one first pseudo identity; sending, by the terminal device, a slice access request message to the access network device, where the slice access request message includes the second pseudo identity, and the second pseudo identity is a pseudo identity of a second core network device; receiving, by the terminal device, a security mode command sent by the second core network device; sending, by the terminal device, a security mode complete command to the second core network device; and sending, by the terminal device, the second NSSAI to the second core network device based on the security mode command.

The following describes each device in the foregoing system. An implementation principle and technical effects of the devices are similar to the foregoing principle and technical effects, and details are not repeated herein.

According to a sixteenth aspect, this application provides a network slice allocation device, including: a transmitter, a receiver, a processor, and a memory. The transmitter is configured to send at least one first pseudo identity to a terminal device, where each first pseudo identity is a pseudo identity of a first core network device, and the first core network device is a core network device that previously allocated a network slice to the terminal device; the receiver is configured to receive a slice access request message sent by the terminal device, where the slice access request message includes a second pseudo identity, and the second pseudo identity is one of the at least one first pseudo identity; the memory is configured to store code, and when the code is run by the processor, the processor is configured to determine a second core network device corresponding to the second pseudo identity; and the transmitter is further configured to send the slice access request message to the second core network device.

According to a seventeenth aspect, this application provides a network slice allocation device, including: a transmitter, a receiver, a processor, and a memory. The receiver is configured to receive at least one first pseudo identity sent by an access network device, where each first pseudo identity is a pseudo identity of a first core network device, and the first core network device is a core network device that previously allocated a network slice to the network slice allocation device; the memory is configured to store code, and when the code is run by the processor, the processor is configured to: establish a mapping relationship between each first pseudo identity and at least one piece of first slice selection assistance information NSSAI, and determine a second pseudo identity based on the mapping relationship and second NSSAI, where the second pseudo identity is one of the at least one first pseudo identity; the transmitter is further configured to send a slice access request message to the access network device, where the slice access request message includes the second pseudo identity, and the second pseudo identity is a pseudo identity of a second core network device; the receiver is further configured to receive a security mode command sent by the second core network device; the transmitter is further configured to send a security mode complete command to the second core network device; and the transmitter is further configured to send the second NSSAI to the second core network device based on the security mode command.

According to an eighteenth aspect, this application provides a computer storage medium, configured to store a computer software instruction used by the first core network device in the second aspect. The computer software instruction includes a program designed for performing the second aspect.

According to a nineteenth aspect, this application provides a computer storage medium, configured to store a computer software instruction used by the second core network device in the third aspect. The computer software instruction includes a program designed for performing the third aspect.

According to a twentieth aspect, this application provides a computer storage medium, configured to store a computer software instruction used by the terminal device in the fourth aspect. The computer software instruction includes a program designed for performing the fourth aspect.

According to a twenty-first aspect, this application provides a computer storage medium, configured to store a computer software instruction used by the access network device in the ninth aspect. The computer software instruction includes a program designed for performing the ninth aspect.

According to a twenty-second aspect, this application provides a computer storage medium, configured to store a computer software instruction used by the terminal device in the tenth aspect. The computer software instruction includes a program designed for performing the tenth aspect.

According to a twenty-third aspect, this application provides a computer storage medium, configured to store a computer software instruction used by the access network device in the fourteenth aspect. The computer software instruction includes a program designed for performing the fourteenth aspect.

According to a twenty-fourth aspect, this application provides a computer storage medium, configured to store a computer software instruction used by the terminal device in the fifteenth aspect. The computer software instruction includes a program designed for performing the fifteenth aspect.

According to a twenty-fifth aspect, this application provides a computer program product, where the computer program product includes an instruction, and when the computer program product is executed by a computer, the instruction enables the computer to perform a function performed by the first core network device in the second aspect.

According to a twenty-sixth aspect, this application provides a computer program product, where the computer program product includes an instruction, and when the computer program is executed by a computer, the instruction enables the computer to perform a function performed by the second core network device in the third aspect.

According to a twenty-seventh aspect, this application provides a computer program product, where the computer program product includes an instruction, and when the computer program is executed by a computer, the instruction enables the computer to perform a function performed by the terminal device in the fourth aspect.

According to a twenty-eighth aspect, this application provides a computer program product, where the computer program product includes an instruction, and when the computer program is executed by a computer, the instruction enables the computer to perform a function performed by the access network device in the ninth aspect.

According to a twenty-ninth aspect, this application provides a computer program product, where the computer program product includes an instruction, and when the computer program is executed by a computer, the instruction enables the computer to perform a function performed by the terminal device in the tenth aspect.

According to a thirtieth aspect, this application provides a computer program product, where the computer program product includes an instruction, and when the computer program is executed by a computer, the instruction enables the computer to perform a function performed by the access network device in the fourteenth aspect.

According to a thirty-first aspect, this application provides a computer program product, where the computer program product includes an instruction, and when the computer program is executed by a computer, the instruction enables the computer to perform a function performed by the terminal device in the fifteenth aspect.

Accordingly, this application provides the network slice allocation method, device, and system, and the system includes the terminal device, the first core network device, the second core network device, and the third core network device. The terminal device is configured to: encrypt the NSSAI and the identity of the terminal device by using a public key of a home network, to obtain the encrypted information, and send a slice access request message to the first core network device, where the slice access request message includes the encrypted information. The first core network device is configured to send the encrypted information to the second core network device. The second core network device is configured to: decrypt the encrypted information by using a private key of the home network, to obtain the NSSAI and the identity of the terminal device, generate an authentication vector based on the identity of the terminal device, and send the NSSAI and the authentication vector to the first core network device. The first core network device is further configured to determine the third core network device based on the NSSAI; and when the first core network device determines that the first core network device is different from the third core network device, the first core network device is further configured to send the slice access request message, the NSSAI, and the authentication vector to the third core network device. The third core network device is configured to allocate a network slice to the terminal device based on the slice access request message, the NSSAI, and the authentication vector. The terminal device does not directly send the NSSAI to the core network device, but uses an encryption technology for the NSSAI and the ID of the terminal device, to obtain the encrypted information, and sends the encrypted information to the first core network device. In this manner, security risks in a network communications system can be reduced. In addition, because the first core network device cannot learn of the NSSAI, the first core network device sends the encrypted information to the second core network device to decrypt the encrypted information by using the private key of the home network, to obtain the NSSAI. Based on this, the second core network device sends the NSSAI to the first core network device. Based on this, a core network side has obtained the NSSAI, so that the core network side can allocate a network slice to the terminal device. Therefore, the network slice allocation system in this application can allocate a network slice to the terminal device, and can reduce the security risks to the network communications system.

DESCRIPTION OF EMBODIMENTS

In the following, some terms in this application are explained and described, to help a person skilled in the art have a better understanding. These explanations and descriptions are provided by way of example and not limitation.

A terminal device is also referred to as user equipment (UE), a mobile station (MS), a mobile terminal (MT), or the like, and is a device, for example, a handheld device or a vehicle-mounted device having a wireless connection function, that provides a user with voice and/or data connectivity. Currently, some examples of terminal devices are: a mobile phone, a tablet, a notebook computer, a palmtop computer, a mobile internet device (MID), a wearable device, for example, a smartwatch, a smart band, a pedometer, and the like, a computer having a wireless receiving and sending function, a virtual reality (VR) terminal device, an augmented reality (AR) terminal device, a wireless terminal in industrial control (industrial control), a wireless terminal in unmanned driving, a wireless terminal in remote medical surgery, a wireless terminal in a smart grid, a wireless terminal in transportation safety, a wireless terminal in a smart city, a wireless terminal in a smart home, and the like.

A radio access network (RAN) is a network part in which a terminal device accesses a wireless network. A RAN node or device is a node or device in the radio access network, and may also be referred to as a base station or an access network device. Currently, some examples of access network devices are: a gNB, a transmission reception point (TRP), an evolved NodeB (eNB), a radio network controller (RNC), a NodeB (NB), a base station controller (BSC), a base transceiver station (BTS), a home base station (for example, a Home evolved NodeB or Home Node B, HNB), a baseband unit (BBU), or a WiFi access point (AP). In addition, in a network structure, the RAN may include a centralized unit (CU) node and a distributed unit (DU) node, and the access network device may be a CU node or a DU node. In this structure, a protocol layer of an eNB in long term evolution (LTE) is split, where some functions of the protocol layer are controlled in the CU in a centralized manner, remaining or all functions of the protocol layer are distributed in DUs, and the CU controls the DUs in a centralized manner. The embodiments of this application impose no limitation on a specific technology and a specific device form used by a radio access network device.

Figure 1:
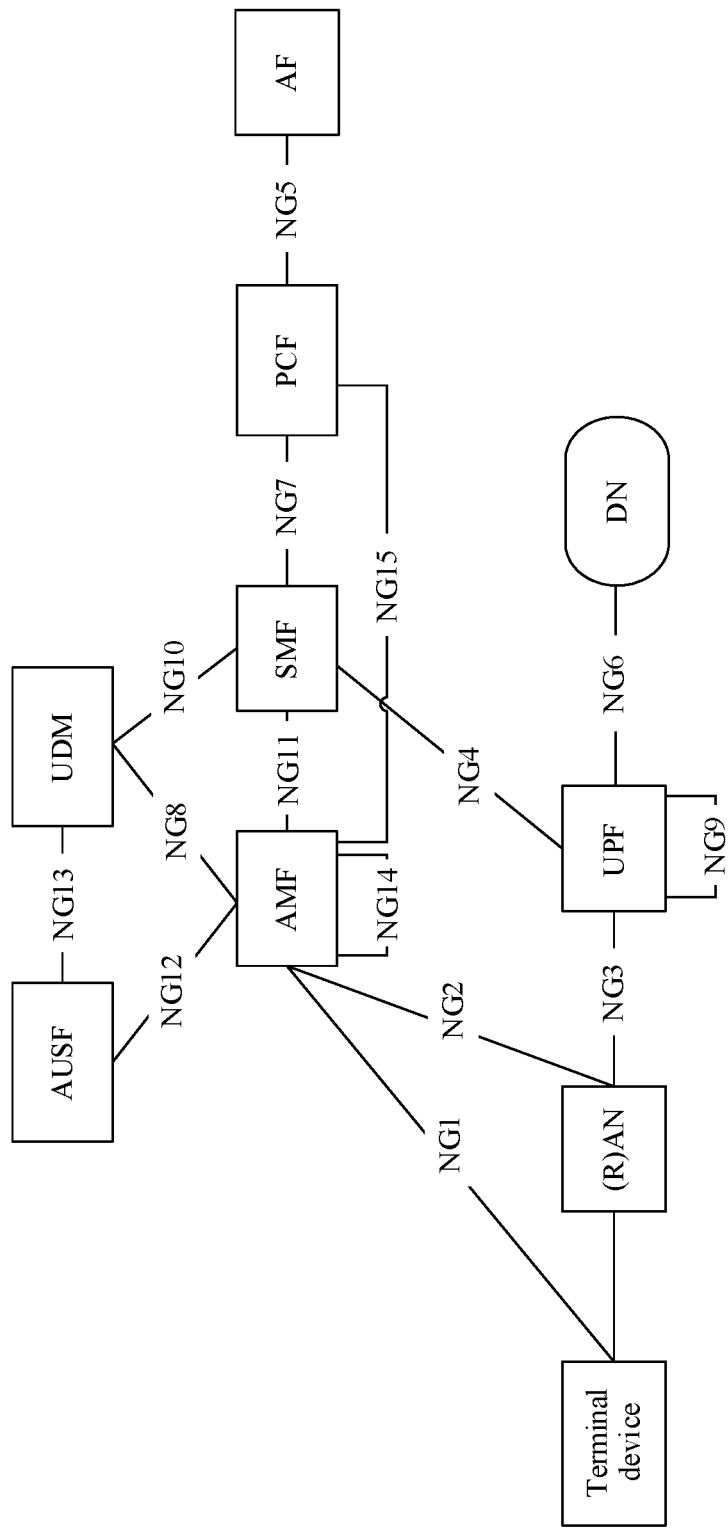
FIG. 1 is a schematic diagram of a network architecture according to an embodiment of this application.
Figure 2:
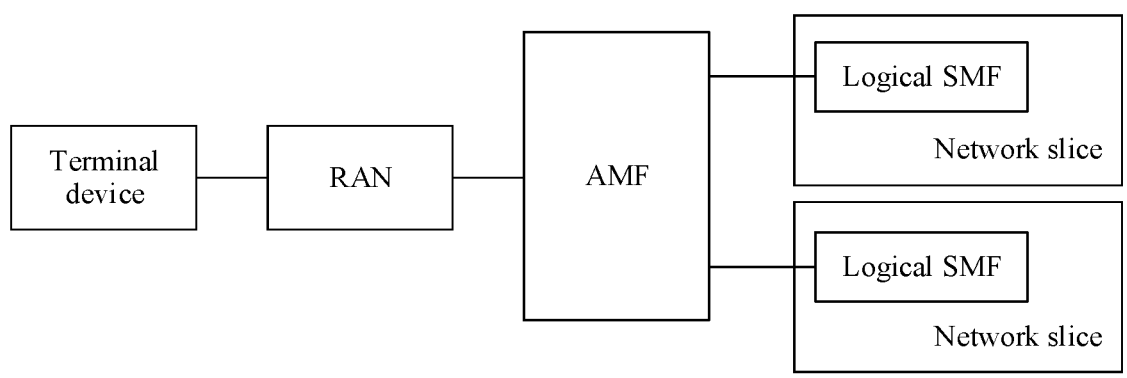
FIG. 2 is a partial schematic diagram of a network including a network slice according to an embodiment of this application.

A concept of a network slice is introduced in a 5G network. The network slice is a virtualized logical dedicated network, and may be customized based on different service requirements. Specifically, FIG. 1 is a schematic diagram of a network architecture according to an embodiment of this application, and FIG. 2 is a partial schematic diagram of a network including a network slice according to an embodiment of this application. The network slice is described with reference to FIG. 1 and FIG. 2, and a mobility management entity (MME) in long term evolution (LTE) is decomposed in the 5G network into: an AMF entity, a security anchor function (SEAF) entity, a session management function (SMF) entity, and the like.

The AMF entity is used for access control authorization, and mobility and registration management. For example, the AMF entity may allocate a network slice to the terminal device.

The SEAF entity is used to obtain an intermediate key and the like in an authentication process of the terminal device.

The SMF entity is used for: session establishment, modification, deletion, and management; and selecting a user plane function entity (UPF), and the like.

As shown in FIG. 2, the SMF entity may be logically divided into a plurality of logical SMFs, and each logical SMF belongs to one network slice. Actually, one network slice may include a plurality of logical SMFs, and one network slice may further include another logical network element. This is not limited in this application.

Based on the network architectures shown in FIG. 1 and FIG. 2, the terminal device is connected to a data network (DN) through the following two steps:

1. An access network device selects an AMF entity for the terminal device, and the AMF entity allocates the network slice to the terminal device, for example, the AMF entity allocates a slice instance to the terminal device.

2. The terminal device establishes one or more protocol data unit (PDU) session connections to the DN by using the slice instance.

In the prior art, step 1 is implemented in the following manner: The terminal device needs to send a slice access request message to a base station, and the base station selects an AMF entity for the terminal device based on the slice access request message. Then, the AMF entity allocates the network slice to the terminal device. The slice access request message includes NSSAI, and the NSSAI includes an SST. Optionally, the NSSAI further includes an SD. Then, the NSSAI is NSSAI in a plaintext form. This causes security risks to a network communications system. To reduce the security risks of the network communications system, this application provides a network slice allocation method, device, and system.

Figure 3:
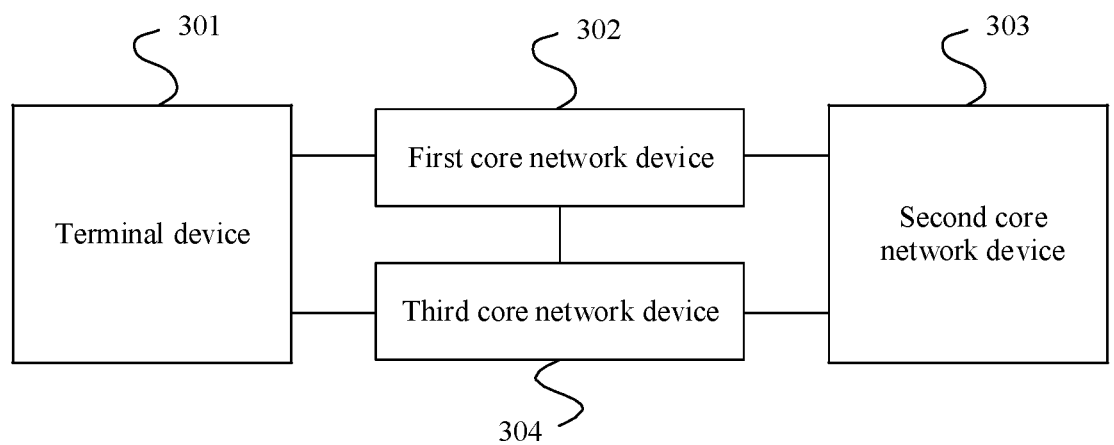
FIG. 3 is a schematic diagram of a network slice allocation system according to an embodiment of this application.

Specifically, FIG. 3 is a schematic diagram of a network slice allocation system according to an embodiment of this application. As shown in FIG. 3, the system includes: a terminal device 301, a first core network device 302, a second core network device 303, and a third core network device 304.

The terminal device 301 is configured to: encrypt NSSAI and an identity of the terminal device by using a public key of a home network, to obtain encrypted information, and send a slice access request message to the first core network device, where the slice access request message includes the encrypted information.

The first core network device 302 is configured to send the encrypted information to the second core network device 303.

The second core network device 303 is configured to: decrypt the encrypted information by using a private key of the home network, to obtain the NSSAI and the identity of the terminal device, generate an authentication vector based on the identity of the terminal device, and send the NSSAI and the authentication vector to the first core network device 302.

The first core network device 302 is further configured to determine the third core network device 304 based on the NSSAI; and when the first core network device 302 determines that the first core network device 302 is different from the third core network device 304, the first core network device 302 is further configured to send the slice access request message, the NSSAI, and the authentication vector to the third core network device 304.

The third core network device 304 is configured to allocate a network slice to the terminal device 301 based on the slice access request message, the NSSAI, and the authentication vector.

Specifically, in this embodiment, the first core network device may be understood as a pseudo AMF entity, or a network element that has a function similar to that of the pseudo AMF entity. This is not limited in this application. The second core network device may be a unified data management (UDM) entity in the home network, or a network element that has a function similar to that of the UDM entity. This is not limited in this application. The third core network device may be understood as a correct AMF entity, or a network element that has a function similar to that of the correct AMF entity. This is not limited in this application.

The home network is a home network of the terminal device 301. The public key of the home network and the private key of the home network are pre-stored in the second core network device. The private key of the home network is pre-stored in the terminal device. The terminal device 301 may use an identity-based encryption (IBE) technology for the NSSAI and the identity (ID) of the terminal device, to obtain the encrypted information. Certainly, another encryption technology may also be used. This is not limited in this application. Based on this, the second core network device 303 may use a decryption technology corresponding to the encryption technology. This is not limited in this application.

The ID of the terminal device may be a media access control (MAC) address, an internet protocol (IP) address, a mobile phone number, an international mobile equipment identity (IMEI), an international mobile subscriber identity (IMSI), an IP multimedia private identity (IMPI), a temporary mobile subscriber identity (TMSI), an IP multimedia public identity (IMPU), a globally unique temporary UE identity (GUTI), or the like. Any identity that can uniquely identify the terminal device may be used as the ID of the terminal device. This is not limited in this application.

After obtaining the encrypted information, the terminal device 301 sends the slice access request message to the first core network device 302, and the slice access request message is used by the terminal device to request to access the network slice. The slice access request message includes the encrypted information. Optionally, the slice access request message further includes information such as a registration type, a security parameter, a device security capability, and a PDU session status. The registration type is initial access or re-access. The security parameter may indicate a message authentication code (MAC) algorithm that is supported by the terminal device for using, whether the terminal device supports an RSA encryption algorithm, or the like.

Specifically, the terminal device 301 sends the slice access request message to the access network device. Because the access network device does not have the public key and the private key of the home network, the access network device can first select only one first core network device 302 for the terminal device 301, and the access network device may randomly select one first core network device, or the access network device may select one first core network device according to a particular rule policy. This is not limited in this application. Based on this, the first core network device 302 may be a pseudo core network device, that is, the first core network device 302 is not the third core network device 304. The first core network device 302 may also be exactly the third core network device 304. Then, the access network device sends the slice access request message to the first core network device 302.

The first core network device 302 sends the encrypted information to the second core network device 303. Because the second core network device 303 pre-stores the public key of the home network, the second core network device 303 may decrypt the encrypted information by using the public key of the home network, to obtain the NSSAI and the ID of the terminal device. Optionally, the second core network device 303 generates a symmetric key K based on the ID of the terminal device, and then generates an authentication vector based on the symmetric key K. The authentication vector includes an authentication token (AUTNHSS), an expected response (XRES), and an access security management key (KASME). The second core network device 303 may alternatively generate the authentication vector by using another method in the prior art. This is not limited in this application.

The second core network device 303 sends the NSSAI and the authentication vector to the first core network device 302. The first core network device 302 determines the third core network device 304 based on the NSSAI. For example, when the NSSAI includes only an SST, the first core network device 302 determines a network slice type indicated by the SST, and determines a third core network device 304 that can provide a service of this type. When the NSSAI includes an SST and an SD, the first core network device 302 determines a network slice type indicated by the SST and a slice instance indicated by the SD, and determines a third core network device 304 that can provide the type and the slice instance.

When the first core network device 302 determines that the first core network device 302 is different from the third core network device 304, the first core network device 302 sends the slice access request message, the NSSAI, and the authentication vector to the third core network device 304. Optionally, after the third core network device 304 receives the authentication vector, the third core network device 304 and the terminal device 301 first perform network two-way authentication. A network two-way authentication method in the prior art may be used in this application. This is not limited in this application. Then, the third core network device 304 allocates the network slice to the terminal device 301 based on the slice access request message and the NSSAI. For example, when the NSSAI includes only an SST, the third core network device 304 determines a network slice type indicated by the SST, and allocates a network slice of this type to the terminal device 301. When the NSSAI includes an SST and an SD, the third core network device 304 determines a network slice type indicated by the SST and a slice instance indicated by the SD, and provides a network slice corresponding to the type and the slice instance to the terminal device 301.

It should be noted that, when the third core network device 304 allocates the network slice to the terminal device 301, functions of the slice access request message are as follows: In one aspect, the message is used to trigger the third core network device 304 to allocate the network slice to the terminal device 301; and in another aspect, as mentioned above, the message includes information such as a registration type, a security parameter, a device security capability, and a PDU session status. In addition to considering the NSSAI, the third core network device 304 further needs to consider the information, to allocate the network slice to the terminal device 301. Then, for how the third core network device 304 allocates the network slice to the terminal device 301 based on the slice access request message and the NSSAI, a related method in the prior art may be used in this application. This is not limited in this application.

When the first core network device 302 determines that the first core network device 302 is the same as the third core network device 304, the first core network device 302 allocates the network slice to the terminal device 301 based on the slice access request message, the NSSAI, and the authentication vector. In addition, for how the first core network device 302 allocates the network slice to the terminal device 301 based on the slice access request message and the NSSAI, a related method in the prior art may be used in this application. This is not limited in this application.

It should be noted that this application is not only applicable to a case in which the terminal device is located in the home network, but also applicable to a case in which the terminal device is located in a visited network. When the terminal device is in the home network, the access network device, the first core network device, the second core network device, and the third core network device are also devices in the home network. When the terminal device is in the visited network, that is, when the terminal device is in a roaming state, the access network device, the first core network device, and the third core network device are also devices in the visited network. However, the second core network device is a device in the home network.

Accordingly, this application provides the network slice allocation system. The terminal device does not directly send the NSSAI to the core network device, but uses an encryption technology for the NSSAI and the ID of the terminal device, to obtain the encrypted information, and sends the encrypted information to the first core network device. In this way, security risks in the network communications system can be reduced. In addition, because the first core network device cannot learn of the NSSAI, the first core network device sends the encrypted information to the second core network device to decrypt the encrypted information by using the private key of the home network, to obtain the NSSAI. Based on this, the second core network device sends the NSSAI to the first core network device. Based on this, a core network side has obtained the NSSAI, so that the core network side can allocate the network slice to the terminal device. Therefore, the network slice allocation system in this application can allocate the network slice to the terminal device, and can reduce the security risks to the network communications system.

Figure 4:
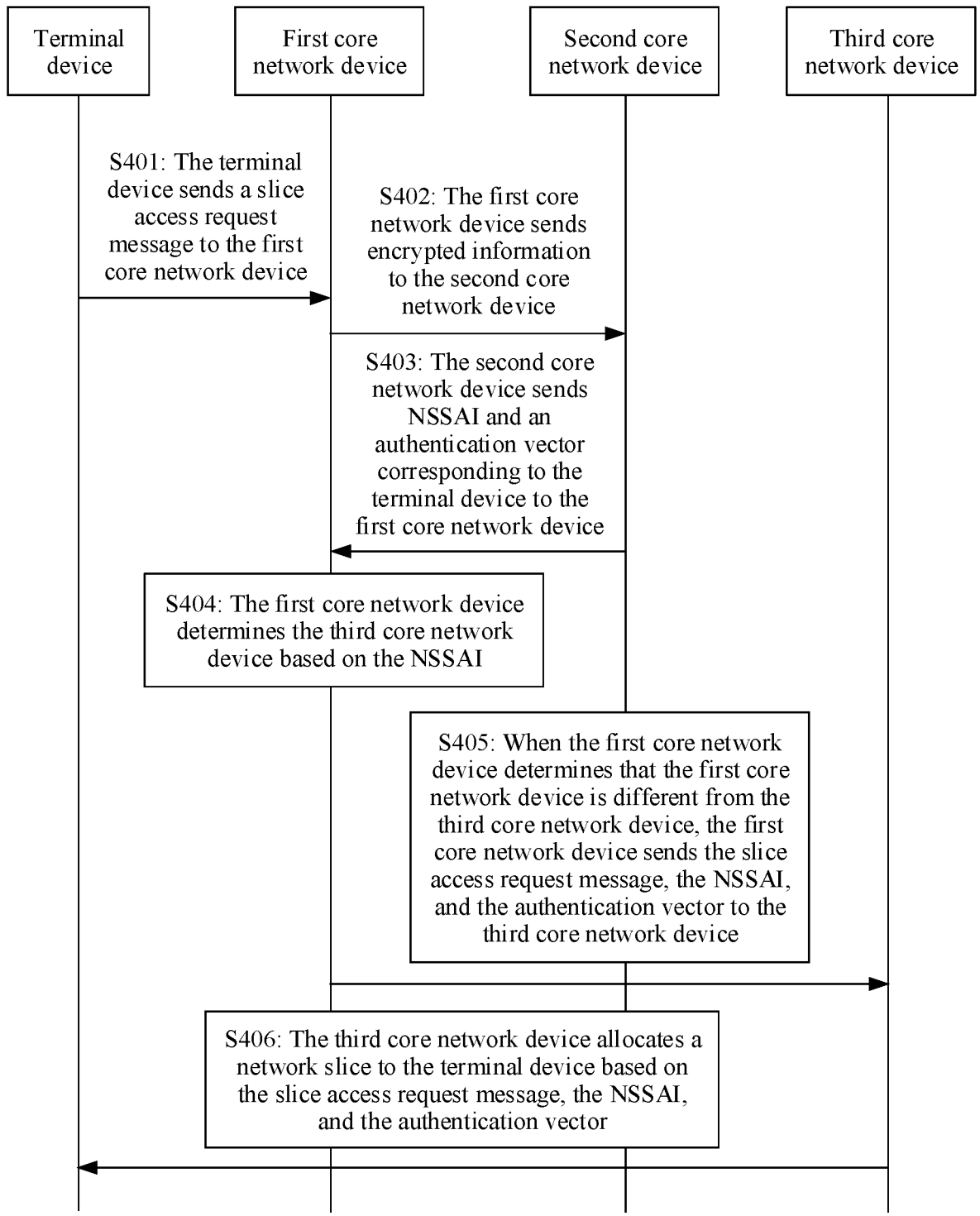
FIG. 4 is an interactive flowchart of a network slice allocation method according to an embodiment of this application.

FIG. 4 is an interactive flowchart of a network slice allocation method according to an embodiment of this application. As shown in FIG. 4, the method includes the following processes:

Step S401: A terminal device sends a slice access request message to a first core network device.

The slice access request message includes encrypted information, and the encrypted information is information obtained by the terminal device by encrypting NSSAI and an identity of the terminal device by using a public key of a home network. Specifically, the terminal device sends the slice access request message to an access network device. Because the access network device does not have the public key and a private key of the home network, the access network device can first select only one first core network device for the terminal device, and the access network device may randomly select one first core network device, or the access network device may select one first core network device according to a particular rule policy. This is not limited in this application. Based on this, the first core network device may be a pseudo core network device, that is, the first core network device is not the foregoing third core network device. Certainly, the first core network device may also be exactly the third core network device. Then, the access network device sends the slice access request message to the first core network device.

Step S402: The first core network device sends the encrypted information to a second core network device.

Step S403: The second core network device sends the NSSAI and an authentication vector corresponding to the terminal device to the first core network device.

The NSSAI is obtained by the second core network device by decrypting the encrypted information by using the private key of the home network.

Step S404: The first core network device determines a third core network device based on the NSSAI.

The third core network device is a core network device that allocates a network slice to the terminal device.

Step S405: When the first core network device determines that the first core network device is different from the third core network device, the first core network device sends the slice access request message, the NSSAI, and the authentication vector to the third core network device.

Step S406: The third core network device allocates the network slice to the terminal device based on the slice access request message, the NSSAI, and the authentication vector.

The network slice allocation method provided in this application may be performed by the foregoing network slice allocation system. Implementation principles and technical effects of the method and the system are similar, and details are not repeated herein.

Figure 5:
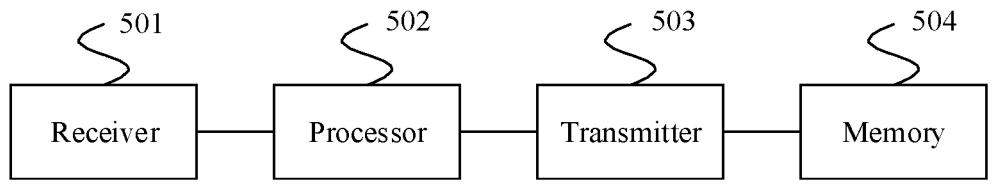
FIG. 5 is a schematic structural diagram of a network slice allocation device according to an embodiment of this application.

FIG. 5 is a schematic structural diagram of a network slice allocation device according to an embodiment of this application. As shown in FIG. 5, the device includes: a receiver 501, a processor 502, a transmitter 503, and a memory 504.

The receiver 501 is configured to receive a slice access request message sent by a terminal device, the slice access request message includes encrypted information, and the encrypted information is information obtained by the terminal device by encrypting NSSAI and an identity of the terminal device by using a public key of a home network. The transmitter 503 is configured to send the encrypted information to a second core network device. The receiver 501 is further configured to receive the NSSAI and an authentication vector corresponding to the terminal device that are sent by the second core network device, and the NSSAI is obtained by the second core network device by decrypting the encrypted information by using a private key of the home network. The memory 504 is configured to store code, and when the code is run by the processor 502, the processor 502 is configured to determine a third core network device based on the NSSAI, where the third core network device is a core network device that allocates a network slice to the terminal device. The transmitter 503 is configured to send, when the processor 502 determines that the network slice allocation device is different from the third core network device, the slice access request message, the NSSAI, and the authentication vector to the third core network device, to enable the third core network device to allocate the network slice to the terminal device based on the slice access request message, the NSSAI, and the authentication vector.

The network slice allocation device provided in this application is the first core network device in the foregoing network slice allocation system. Implementation principles and technical effects of the network slice allocation device are similar to those of the first core network device, and details are not repeated herein.

Figure 6:
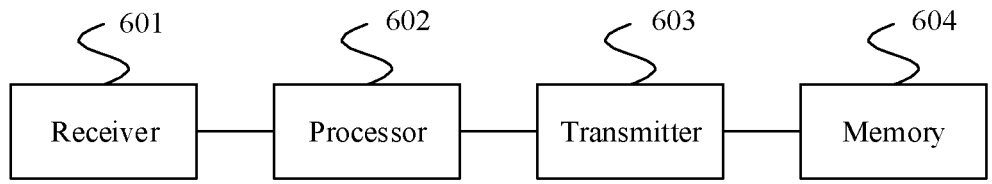
FIG. 6 is a schematic structural diagram of a network slice allocation device according to another embodiment of this application.

FIG. 6 is a schematic structural diagram of a network slice allocation device according to another embodiment of this application. As shown in FIG. 6, the device includes: a receiver 601, a processor 602, a transmitter 603, and a memory 604.

The receiver 601 is configured to receive encrypted information sent by a first core network device, where the encrypted information is information obtained by a terminal device by encrypting NSSAI and an identity of the terminal device by using a public key of a home network. The memory 604 is configured to store code, and when the code is run by the processor 602, the processor 602 is configured to decrypt the encrypted information by using a private key of the home network, to obtain the NSSAI and the identity of the terminal device, and generate an authentication vector based on the identity of the terminal device. The transmitter 603 is configured to send the NSSAI and the authentication vector to the first core network device.

The network slice allocation device provided in this application is the second core network device in the foregoing network slice allocation system. Implementation principles and technical effects of the network slice allocation device are similar to those of the second core network device, and details are not repeated herein.

Figure 7:
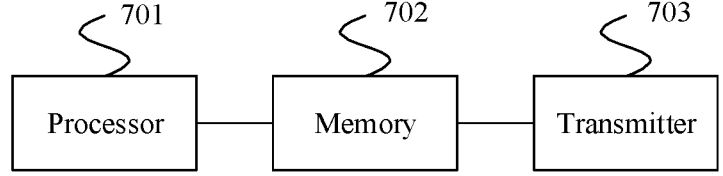
FIG. 7 is a schematic structural diagram of a network slice allocation device according to still another embodiment of this application.

FIG. 7 is a schematic structural diagram of a network slice allocation device according to still another embodiment of this application. As shown in FIG. 7, the device includes: a processor 701, a memory 702, and a transmitter 703.

The memory 702 is configured to store code, and when the code is run by the processor 701, the processor 701 is configured to encrypt NSSAI and an identity of the network slice allocation device by using a public key of a home network, to obtain encrypted information. The transmitter 703 is configured to send a slice access request message to a first core network device, where the slice access request message includes the encrypted information.

The network slice allocation device provided in this application is the terminal device in the foregoing network slice allocation system. Implementation principles and technical effects of the network slice allocation device are similar to those of the terminal device, and details are not repeated herein.

Figure 8:
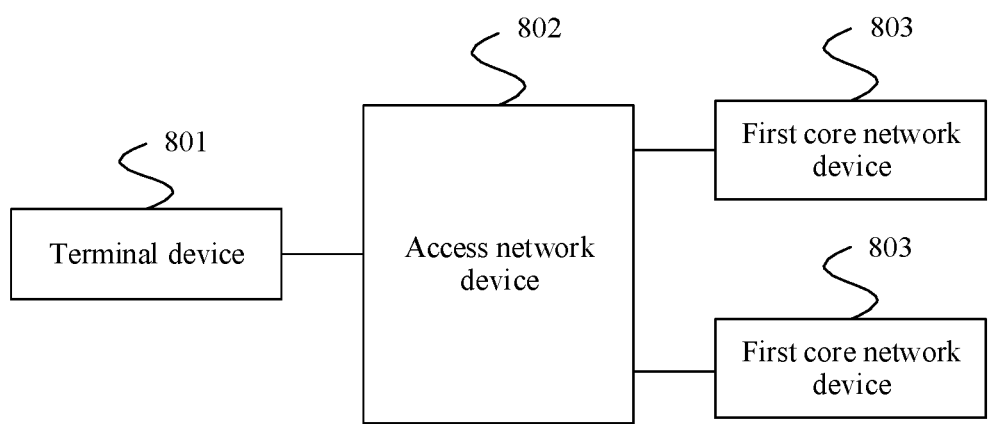
FIG. 8 is a schematic diagram of a network slice allocation system according to another embodiment of this application.

FIG. 8 is a schematic diagram of a network slice allocation system according to another embodiment of this application. As shown in FIG. 8, the system includes: a terminal device 801, an access network device 802, and at least one first core network device 803 (two first core network devices are used as an example in FIG. 8), and the at least one first core network device 803 includes a second core network device.

The access network device 802 is configured to broadcast at least one first mapping relationship. Each first mapping relationship is a mapping relationship between one first pseudo identity and at least one piece of first NSSAI, and the first pseudo identity is a pseudo identity of a first core network device. The terminal device 801 is configured to: determine a second pseudo identity based on second NSSAI and the at least one first mapping relationship, and send a slice access request message to the access network device 802. The slice access request message includes the second pseudo identity. The access network device 802 is further configured to: determine a second core network device corresponding to the second pseudo identity, and send the slice access request message to the second core network device. The second core network device is configured to:

send a security mode command to the terminal device 801, receive a security mode complete command sent by the terminal device, receive the second NSSAI sent by the terminal device based on the security mode command, and allocate a network slice to the terminal device based on the slice access request message and the second NSSAI.

In this embodiment, the first core network device may be understood as an AMF entity, or a network element that has a function similar to that of the AMF entity. This is not limited in this application. Specifically, the access network device 802 may establish a correspondence between a pseudo ID and NSSAI based on a historical access status of the terminal device. Each pseudo ID corresponds to a non-pseudo ID. For details, reference is made to Table 1:

TABLE 1

| Non-pseudo ID | Pseudo ID | NSSAI |
|---|---|---|
| Non-pseudo ID 1 | Pseudo ID 1 | NSSAI 1<br>NSSAI 2<br>NSSAI 3 |
| Non-pseudo ID<br>...<br>Non-pseudo ID 2 | Pseudo ID<br>...<br>Pseudo ID 2 | NSSAI<br>...<br>NSSAI 4<br>NSSAI 5<br>NSSAI 6 |
| ... | ... | ... |

Optionally, a priority of the first core network device is higher than a first preset threshold, or a priority of each piece of first NSSAI is higher than a second preset threshold.

Specifically, there may be actually many entries in Table 1, and if the access network device broadcasts all correspondences between the pseudo IDs and the NSSAI that are in Table 1, excessively high network overheads are caused. Therefore, the access network device may perform priority sorting on core network devices corresponding to the pseudo IDs in Table 1, or perform priority sorting on the NSSAI in Table 1. In addition, to prevent a non-pseudo ID of the first core network device from being stolen, based on this, the access network device broadcasts only the first mapping relationship. For details, reference is made to Table 2.

TABLE 2

| First pseudo ID | First NSSAI |
|---|---|
| First pseudo ID 1 | First NSSAI 1<br>First NSSAI 2<br>First NSSAI 3 |
| ...<br>First pseudo ID 2 | ...<br>First NSSAI 4<br>First NSSAI 5<br>First NSSAI 6 |
| ... | ... |

It should be noted that, to improve security of a communications network, the access network device may periodically update the first pseudo ID.

After the terminal device 801 obtains the at least one first mapping relationship, the terminal device 801 may determine the second pseudo ID based on the second NSSAI and the at least one first mapping relationship. Herein, it is assumed that the second NSSAI is included in the at least one first mapping relationship. Based on this, the second pseudo ID is one of the first pseudo IDs in Table 1. When the second NSSAI is not in the first mapping relationship, a method in the prior art may be used to implement network slice allocation. This case is not protected in this application.

After determining the second pseudo ID, the terminal device 801 sends the slice access request message to the access network device 802, and the message includes the second pseudo ID. In this case, the access network device 802 may determine, in a manner of querying Table 1, a non-pseudo ID corresponding to the second pseudo ID, determine a second core network device corresponding to the non-pseudo ID, and send the slice access request message to the second core network device. Optionally, the slice access request message includes information such as a registration type, a security parameter, a device security capability, and a PDU session status.

After receiving the slice access request message, the second core network device sends the security mode command (Security Mode Command) to the terminal device 801, and receives the security mode complete command sent by the terminal device. Optionally, the security mode command includes an encryption algorithm identifier, an integrity protection algorithm identifier, device sequence number request information, a hash value, and the like. The security mode complete command includes a sequence number of the terminal device and the like. In conclusion, both the two commands are commands in the prior art. A secure channel may be established between the terminal device 801 and the second core network device by using the two commands. Based on this, the terminal device 801 may send the second NSSAI to the second core network device based on the encryption algorithm identifier, the integrity protection algorithm identifier, the device sequence number request information, the hash value, and the like. To be specific, the terminal device 801 sends the second NSSAI to the second core network device through the secure channel. Finally, the second core network device allocates the network slice to the terminal device based on the slice access request message and the second NSSAI. For example, when the second NSSAI includes only an SST, the second core network device determines a network slice type indicated by the SST, and allocates a network slice of this type to the terminal device 801. When the NSSAI includes an SST and an SD, the second core network device determines a network slice type indicated by the SST and a slice instance indicated by the SD, and provides a network slice corresponding to the type and the slice instance to the terminal device 801.

Optionally, before the sending, by the second core network device, the security mode command to the terminal device 801, the system further includes a process in which the terminal device 801 and the second core network device implement network two-way authentication, where this application may use a network two-way authentication method in the prior art. This is not limited in this application.

Accordingly, this application provides the network slice allocation system. The terminal device does not directly send the NSSAI to the core network device, but sends the second pseudo ID to the access network device, and the access network device determines, based on the second pseudo ID, that the second core network device sends the slice access request message. Then, the secure channel is established between the terminal device and the second core network device, and the terminal device sends the second NSSAI to the second core network device through the secure channel. In other words, sending the second NSSAI through the secure channel can reduce security risks to the network communications system.

Based on the network communications system shown in FIG. 8, further, the system further includes the following several optional manners:

Optionally, the foregoing at least one first mapping relationship is carried in a system information block (SIB). Based on this, the system can reduce signaling overheads.

Optionally, when the terminal device is in a home network, the foregoing at least one piece of first NSSAI is at least one piece of NSSAI in the home network, and the second NSSAI is NSSAI in the home network.

When the terminal device is in a visited network, the at least one piece of first NSSAI is at least one piece of NSSAI in the visited network, and the second NSSAI is NSSAI in a home network of the terminal device.

In this case, the terminal device cannot directly determine the second pseudo ID based on the second NSSAI and the at least one first mapping relationship. In other words, the second pseudo ID cannot be determined based on the second NSSAI and the foregoing content in Table 2. This is because each first NSSAI in Table 2 is NSSAI in the visited network.

Based on this, the terminal device 801 is further configured to obtain at least one second mapping relationship, each second mapping relationship is a correspondence between one piece of first NSSAI and one piece of third NSSAI, and the third NSSAI is NSSAI in the home network of the terminal device; and correspondingly, the terminal device 801 is specifically configured to: determine fourth NSSAI based on the second NSSAI and the at least one second mapping relationship, and determine the second pseudo identity based on the fourth NSSAI and the at least one first mapping relationship, where the fourth NSSAI is one of the at least one piece of first NSSAI.

For details, reference is made to Table 3 for the second mapping relationship:

TABLE 3

| First NSSAI | Third NSSAI |
| --- | --- |
| First NSSAI 1 | Third NSSAI 1 |
| First NSSAI 2 | Third NSSAI 2 |
| First NSSAI 3 | Third NSSAI 3 |
| ... | ... |
| First NSSAI 4 | Third NSSAI 4 |
| First NSSAI 5 | Third NSSAI 5 |
| First NSSAI 6 | Third NSSAI 6 |
| ... | ... |

The second NSSAI is one of at least one piece of third NSSAI, and the fourth NSSAI is one of the at least one piece of first NSSAI. A corresponding second pseudo ID may be determined by searching Table 2 by using the fourth NSSAI.

Accordingly, when the terminal device is in the visited network, the network slice allocation system may effectively determine the second pseudo ID based on the second NSSAI, the at least one first mapping relationship, and the at least one second mapping relationship.

Figure 9:
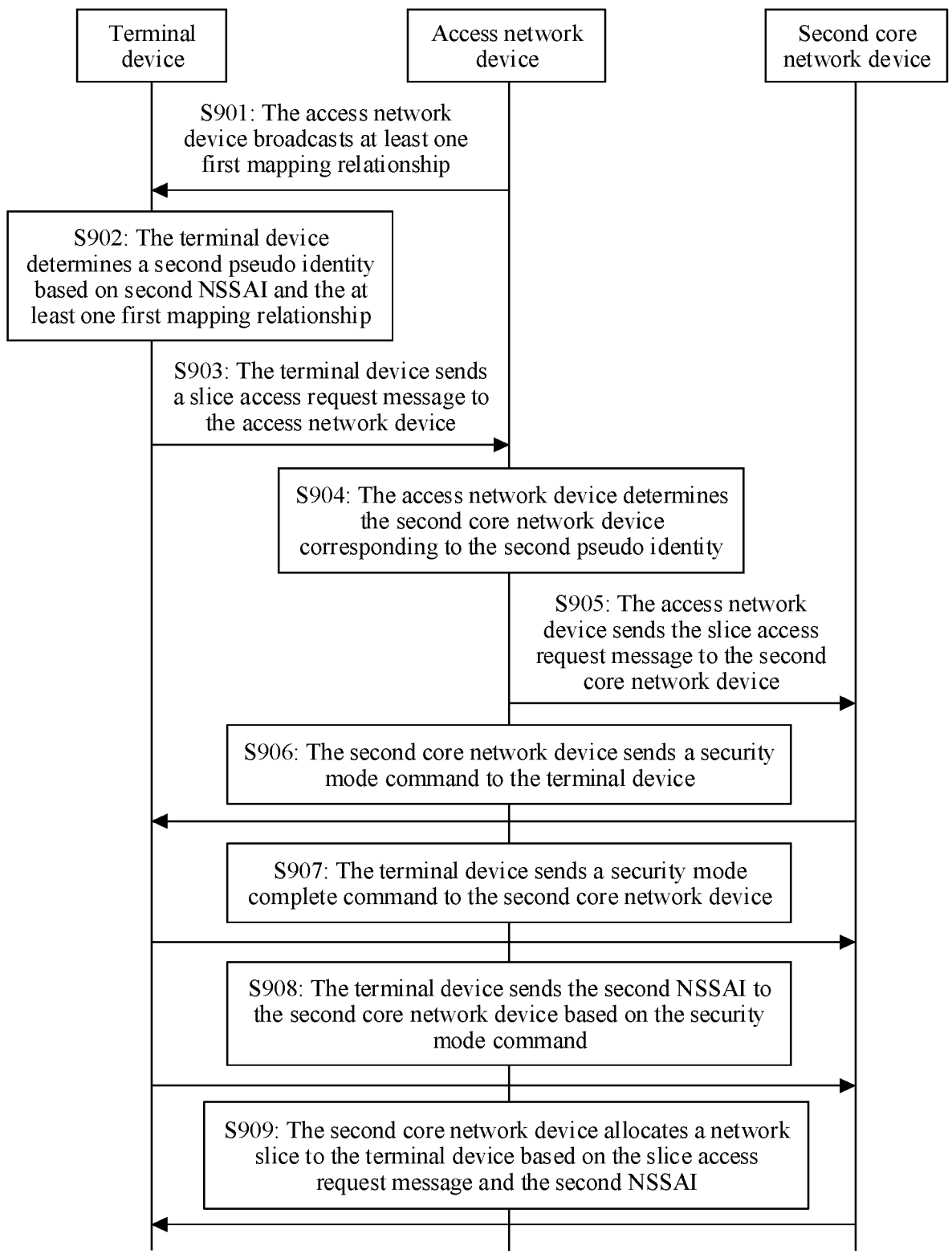
FIG. 9 is an interactive flowchart of a network slice allocation method according to an embodiment of this application.

FIG. 9 is an interactive flowchart of a network slice allocation method according to an embodiment of this application, as shown in FIG. 9, the method includes the following processes:

Step S901: An access network device broadcasts at least one first mapping relationship.

Each first mapping relationship is a mapping relationship between one first pseudo identity and at least one piece of first slice selection assistance information NSSAI, where the first pseudo identity is a pseudo identity of a first core network device.

Step S902: A terminal device determines a second pseudo identity based on second NSSAI and the at least one first mapping relationship. The second pseudo identity is a pseudo identity of a second core network device.

Step S903: The terminal device sends a slice access request message to the access network device. The slice access request message includes the second pseudo identity.

Step S904: The access network device determines the second core network device corresponding to the second pseudo identity.

Step S905: The access network device sends the slice access request message to the second core network device.

Step S906: The second core network device sends a security mode command to the terminal device.

Step S907: The terminal device sends a security mode complete command to the second core network device.

Step S908: The terminal device sends the second NSSAI to the second core network device based on the security mode command.

Step S909: The second core network device allocates a network slice to the terminal device based on the slice access request message and the second NSSAI.

Optionally, before Step S906, the method further includes a process in which the terminal device and the second core network device implement network two-way authentication, where this application may use a network two-way authentication method in the prior art. This is not limited in this application.

Optionally, when the terminal device is in a visited network, the at least one piece of first NSSAI is at least one piece of NSSAI in the visited network; and the second NSSAI is NSSAI in a home network of the terminal device, and before the determining, by the terminal device, the second pseudo identity based on the second NSSAI and the at least one first mapping relationship, the method further includes: obtaining, by the terminal device, at least one second mapping relationship, where each second mapping relationship is a correspondence between one piece of first NSSAI and one piece of third NSSAI, and the third NSSAI is NSSAI in the home network of the terminal device. Correspondingly, the determining, by the terminal device, the second pseudo identity based on the second NSSAI and the at least one first mapping relationship includes: determining, by the terminal device, fourth NSSAI based on the second NSSAI and the at least one second mapping relationship, where the fourth NSSAI is one of the at least one piece of first NSSAI; and determining, by the terminal device, the second pseudo identity based on the fourth NSSAI and the at least one first mapping relationship.

The network slice allocation method provided in this application may be performed by the corresponding network slice allocation system in FIG. 8. Implementation principles and technical effects of the method and the system are similar, and details are not repeated herein.

Figure 10:
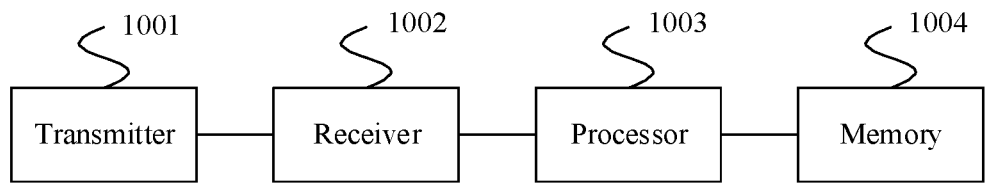
FIG. 10 is a schematic structural diagram of a network slice allocation device according to an embodiment of this application.

FIG. 10 is a schematic structural diagram of a network slice allocation device according to an embodiment of this application. As shown in FIG. 10, the device includes: a transmitter 1001, a receiver 1002, a processor 1003, and a memory 1004.

The transmitter 1001 is configured to broadcast at least one first mapping relationship, each first mapping relationship is a mapping relationship between one first pseudo identity and at least one piece of first slice selection assistance information NSSAI, and the first pseudo identity is a pseudo identity of a first core network device. The receiver 1002 is configured to receive a slice access request message sent by a terminal device, where the slice access request message includes a second pseudo identity, and the second pseudo identity is a pseudo identity determined by the terminal device based on second NSSAI and the at least one first mapping relationship. The memory 1004 is configured to store code, and when the code is run by the processor 1003, the processor 1003 is configured to determine a second core network device corresponding to the second pseudo identity; and the transmitter 1001 is configured to send the slice access request message to the second core network device.

The network slice allocation device provided in this application is the access network device in the network slice allocation system shown in FIG. 8. Implementation principles and technical effects of the network slice allocation device are similar to those of the access network device, and details are not repeated herein.

Figure 11:
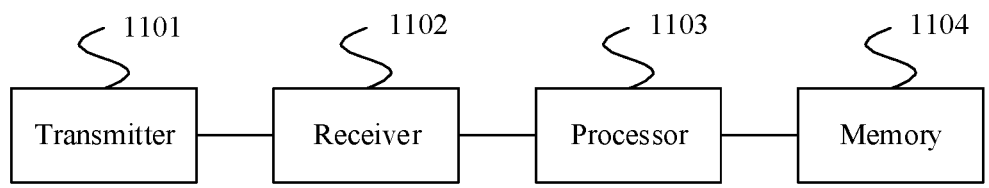
FIG. 11 is a schematic structural diagram of a network slice allocation device according to another embodiment of this application.

FIG. 11 is a schematic structural diagram of a network slice allocation device according to another embodiment of this application. As shown in FIG. 11, the device includes: a transmitter 1101, a receiver 1102, a processor 1103, and a memory 1104.

The receiver 1102 is configured to receive at least one first mapping relationship, where each first mapping relationship is a mapping relationship between one first pseudo identity and at least one piece of first slice selection assistance information NSSAI, and the first pseudo identity is a pseudo identity of a first core network device; and the memory 1104 is configured to store code, and when the code is run by the processor 1103, the processor 1103 is configured to determine a second pseudo identity based on second NSSAI and the at least one first mapping relationship, where the second pseudo identity is a pseudo identity of a second core network device. The transmitter 1101 is configured to send a slice access request message to an access network device, where the slice access request message includes the second pseudo identity. The receiver 1102 is further configured to receive a security mode command sent by the second core network device; the transmitter 1101 is further configured to send a security mode complete command to the second core network device; and the transmitter 1101 is further configured to send the second NSSAI to the second core network device based on the security mode command.

Optionally, when the network slice allocation device is in a visited network, the at least one piece of first NSSAI is at least one piece of NSSAI in the visited network; and the second NSSAI is NSSAI in a home network of a terminal device. The receiver 1102 is further configured to obtain at least one second mapping relationship, where each second mapping relationship is a correspondence between one piece of first NSSAI and one piece of third NSSAI, and the third NSSAI is NSSAI in a home network of the network slice allocation device. The processor 1103 is specifically configured to: determine fourth NSSAI based on the second NSSAI and the at least one second mapping relationship, where the fourth NSSAI is one of the at least one piece of first NSSAI; and determine the second pseudo identity based on the fourth NSSAI and the at least one first mapping relationship.

The network slice allocation device provided in this application is the terminal device in the network slice allocation system shown in FIG. 8. Implementation principles and technical effects of the network slice allocation device are similar to those of the terminal device, and details are not repeated herein.

Figure 12:
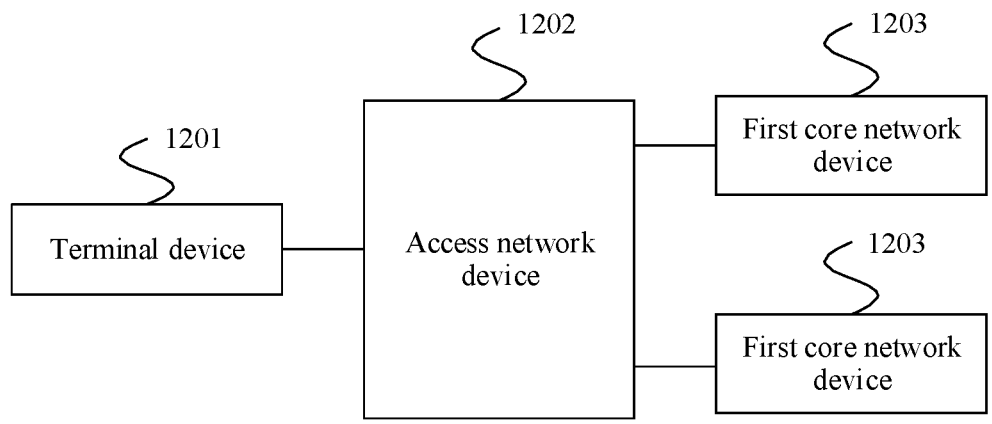
FIG. 12 is a schematic diagram of a network slice allocation system according to still another embodiment of this application.

FIG. 12 is a schematic diagram of a network slice allocation system according to still another embodiment of this application. As shown in FIG. 12, the system includes: a terminal device 1201, an access network device 1202, and at least one first core network device 1203. The at least one first core network device 1203 includes a second core network device.

The terminal device 1201 is configured to receive at least one first pseudo identity sent by the access network device 1202. Each first pseudo identity is a pseudo identity of a first core network device 1203, and the first core network device 1203 is a core network device that previously allocated a network slice to the terminal device 1201.

The terminal device 1201 is further configured to: establish a mapping relationship between each first pseudo identity and at least one piece of first slice selection assistance information NSSAI, determine a second pseudo identity based on the mapping relationship and second NSSAI, and send a slice access request message to the access network device 1202. The slice access request message includes the second pseudo identity, the second pseudo identity is one of the at least one first pseudo identity, and the second pseudo identity is a pseudo identity of the second core network device.

The access network device 1202 is configured to: determine the second core network device corresponding to the second pseudo identity, and send the slice access request message to the second core network device.

The second core network device is configured to: send a security mode command to the terminal device 1201, receive a security mode complete command sent by the terminal device 1201, receive the second NSSAI sent by the terminal device 1201 based on the security mode command, and allocate a network slice to the terminal device 1201 based on the slice access request message and the second NSSAI.

In this embodiment, the first core network device may be understood as an AMF entity, or a network element that has a function similar to that of the AMF entity. This is not limited in this application.

Specifically, the access network device 1202 may obtain the first pseudo ID based on a historical access status of the terminal device. For example, before the access network device 1202 sends the first pseudo ID to the terminal device 1201, the terminal device 1201 sends a slice access request message to the access network device 1202. The slice access request message may include NSSAI, or the access network device 1202 determines the NSSAI by using the slice access request message. Further, a core network device that allocates a network slice to the terminal device and a first pseudo ID of the core network device may be determined based on the NSSAI. Based on this, the access network device 1202 may send the first pseudo ID to the terminal device 1201.

Alternatively, any first core network device 1203 may send, by using a method similar to that used by the access network device 1202, the at least one first pseudo ID to the terminal device 1201 by using the access network device 1202.

The terminal device 1201 may establish the mapping relationship between the first pseudo identity and the at least one piece of first NSSAI. If the terminal device 1201 receives the first pseudo ID this time, a corresponding first NSSAI is NSSAI used for accessing the network slice this time. The mapping relationship between the first pseudo identity and the at least one piece of first NSSAI is similar to that shown in Table 1.

The terminal device 1201 determines the second pseudo identity based on the mapping relationship and second NSSAI, sends the slice access request message to the access network device 1202, where the slice access request message includes the second pseudo identity. The second pseudo identity is one of the at least one first pseudo identity, and the second pseudo identity is a pseudo identity of the second core network device.

After the terminal device 1201 obtains at least one first mapping relationship, the terminal device 1201 may determine the second pseudo ID based on the second NSSAI and the at least one mapping relationship. Herein, it is assumed that the second NSSAI is included in the at least one mapping relationship. Based on this, when the second NSSAI is not in the at least one mapping relationship, a method in the prior art may be used to implement network slice allocation. This case is not protected in this application. After determining the second pseudo ID, the terminal device 1201 sends the slice access request message to the access network device 1202, and the message includes the second pseudo ID. In this case, the access network device 1202 may determine a non-pseudo ID corresponding to the second pseudo ID, determine a second core network device corresponding to the non-pseudo ID, and send the slice access request message to the second core network device. Optionally, the slice access request message includes information such as a registration type, a security parameter, a device security capability, and a PDU session status.

After receiving the slice access request message, the second core network device sends the security mode command (SMC) to the terminal device 1201, and receives the security mode complete command sent by the terminal device. Optionally, the security mode command includes an encryption algorithm identifier, an integrity protection algorithm identifier, device sequence number request information, a hash value, and the like. The security mode complete command includes a sequence number of the terminal device and the like. In conclusion, both the two commands are commands in the prior art. A secure channel may be established between the terminal device 1201 and the second core network device by using the two commands. Based on this, the terminal device 1201 may send the second NSSAI to the second core network device based on the encryption algorithm identifier, the integrity protection algorithm identifier, the device sequence number request information, the hash value, and the like. To be specific, the terminal device 1201 sends the second NSSAI to the second core network device through the secure channel. Finally, the second core network device allocates the network slice to the terminal device based on the slice access request message and the second NSSAI. For example, when the second NSSAI includes only an SST, the second core network device determines a network slice type indicated by the SST, and allocates a network slice of this type to the terminal device 1201. When the NSSAI includes an SST and an SD, the second core network device determines a network slice type indicated by the SST and a slice instance indicated by the SD, and provides a network slice corresponding to the type and the slice instance to the terminal device 1201.

Optionally, before the sending, by the second network device, the security mode command to the terminal device 1201, the system further includes a process in which the terminal device 1201 and the second core network device implement network two-way authentication, where this application may use a network two-way authentication method in the prior art. This is not limited in this application.

Optionally, the at least one first pseudo ID is generated by the access network device 1202 or any first core network device.

Optionally, when the at least one first pseudo ID is generated by the access network device 1202, the at least one first pseudo ID may be transmitted by using an access stratum (AS) security mode command (SMC) sent by the access network device 1202. In this manner, system signaling overheads can be reduced. When the at least one first pseudo ID is generated by any first core network device, the at least one first pseudo ID may be transmitted by using a non-access stratum (NAS) security mode command (SMC) sent by the first core network device. In this manner, system signaling overheads can be reduced.

The embodiments of this application may be applied to the following scenarios: The terminal device saves a mapping relationship between first NSSAI and a first pseudo ID that are used for accessing a current network slice, and then the terminal device enters a sleep or power-off state. After the terminal device is restarted, the terminal device re-initiates a slice access request message, and the slice access request message includes the first pseudo ID. However, the first NSSAI does not need to be sent.

Accordingly, this application provides the network slice allocation system. The terminal device does not directly send the NSSAI to the core network device, but sends the second pseudo ID to the access network device, and the access network device determines, based on the second pseudo ID, that the second core network device sends the slice access request message. Then, the secure channel is established between the terminal device and the second core network device, and the terminal device sends the second NSSAI to the second core network device through the secure channel. In other words, sending the second NSSAI through the secure channel can reduce security risks to the network communications system.

Figure 13A:
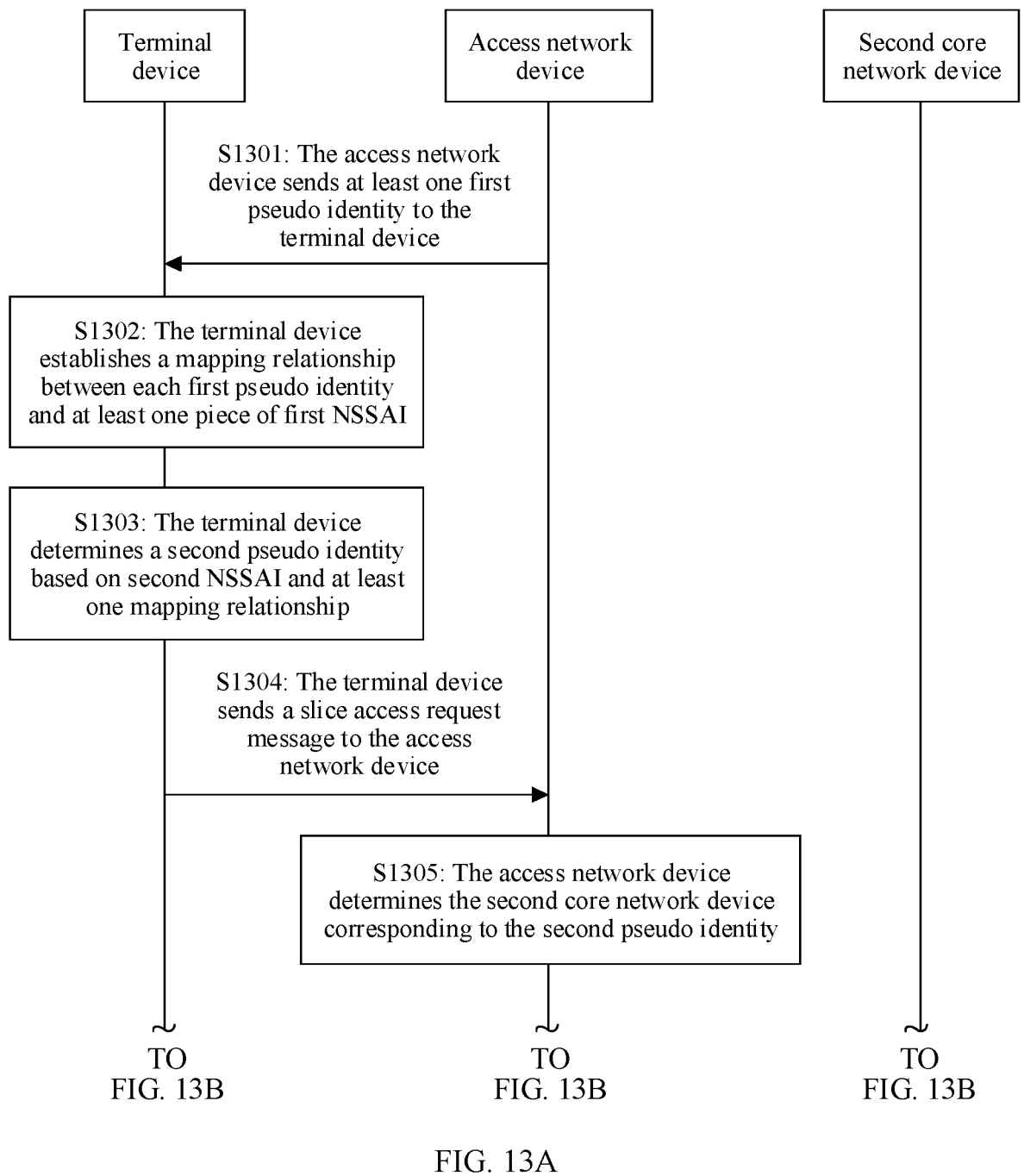
FIG. 13A and FIG. 13B are an interactive flowchart of a network slice allocation method according to an embodiment of this application.
Figure 13B:
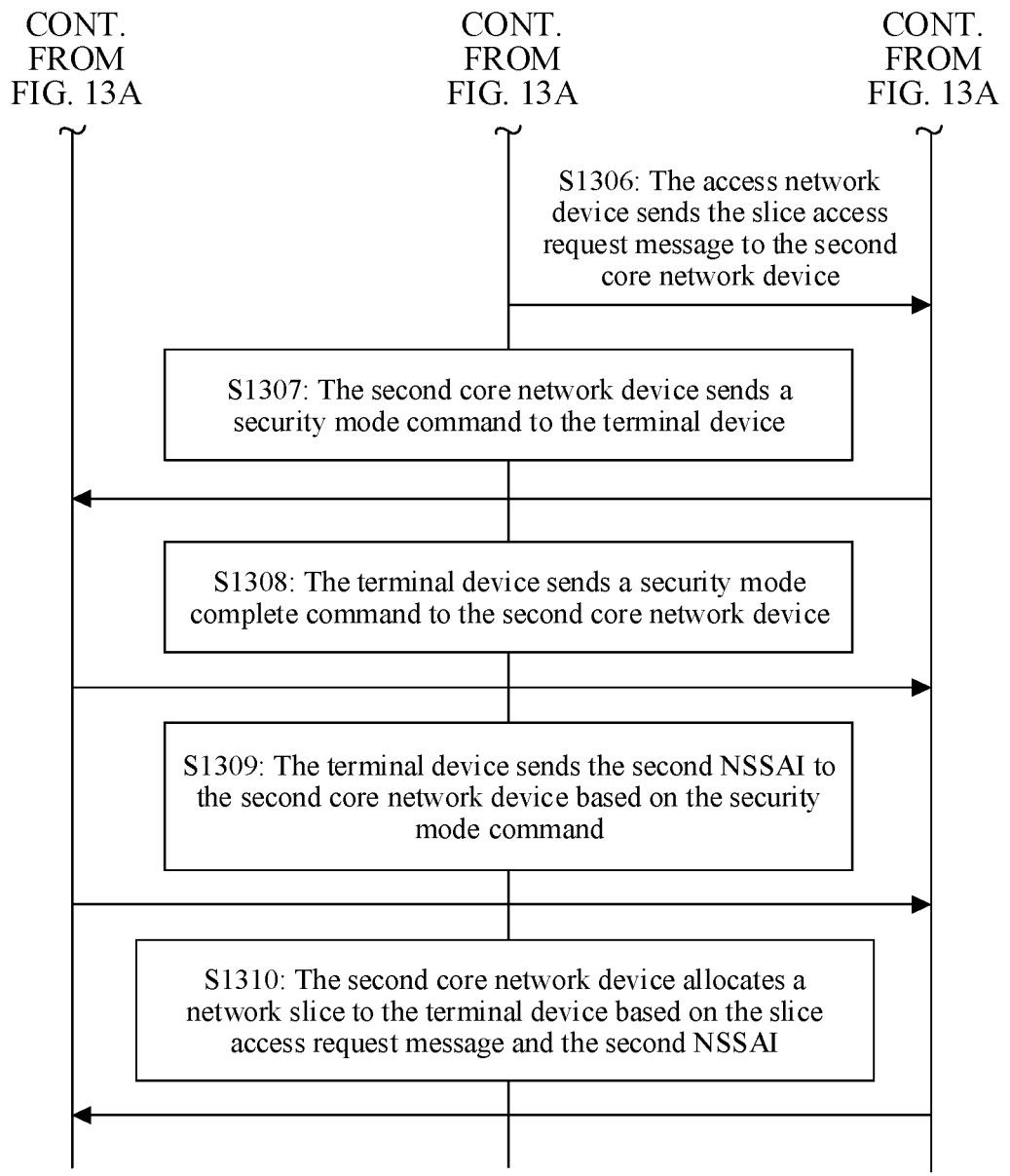

FIG. 13A and FIG. 13B are an interactive flowchart of a network slice allocation method according to an embodiment of this application. As shown in FIG. 13A and FIG. 13B, the method includes the following processes:

Step S1301: An access network device sends at least one first pseudo identity to a terminal device.

Each first pseudo identity is a pseudo identity of a first core network device, and the first core network device is a core network device that previously allocated a network slice to the terminal device. When the at least one first pseudo ID is generated by the access network device, the at least one first pseudo ID may be transmitted by using an AS SMC sent by the access network device. When the at least one first pseudo ID is generated by any first core network device, the at least one first pseudo ID may be transmitted by using a NAS SMC sent by the first core network device.

Step S1302: The terminal device establishes a mapping relationship between each first pseudo identity and at least one piece of first NSSAI.

Step S1303: The terminal device determines a second pseudo identity based on second NSSAI and at least one mapping relationship. The second pseudo identity is a pseudo identity of a second core network device.

Step S1304: The terminal device sends a slice access request message to the access network device. The slice access request message includes the second pseudo identity.

Step S1305: The access network device determines the second core network device corresponding to the second pseudo identity.

Step S1306: The access network device sends the slice access request message to the second core network device.

Step S1307: The second core network device sends a security mode command to the terminal device.

Step S1308: The terminal device sends a security mode complete command to the second core network device.

Step S1309: The terminal device sends the second NSSAI to the second core network device based on the security mode command.

Step S1310: The second core network device allocates a network slice to the terminal device based on the slice access request message and the second NSSAI.

Optionally, before Step S1307, the method further includes a process in which the terminal device and the second core network device implement network two-way authentication, where this application may use a network two-way authentication method in the prior art. This is not limited in this application.

The network slice allocation method provided in this application may be performed by the corresponding network slice allocation system in FIG. 12. Implementation principles and technical effects of the method and the system are similar, and details are not repeated herein.

Figure 14:
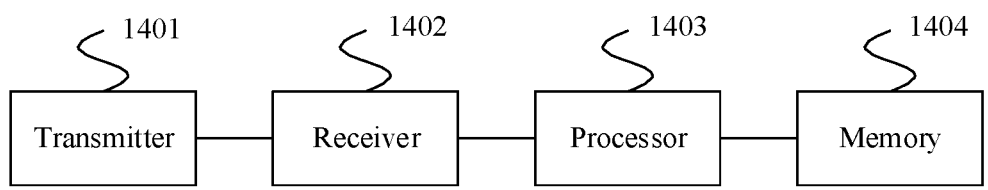
FIG. 14 is a schematic structural diagram of a network slice allocation device according to an embodiment of this application.

FIG. 14 is a schematic structural diagram of a network slice allocation device according to an embodiment of this application. As shown in FIG. 14, the device includes: a transmitter 1401, a receiver 1402, a processor 1403, and a memory 1404.

The transmitter 1401 is configured to send at least one first pseudo identity to a terminal device. Each first pseudo identity is a pseudo identity of a first core network device, and the first core network device is a core network device that previously allocated a network slice to the terminal device. The receiver 1402 is configured to receive a slice access request message sent by the terminal device. The slice access request message includes a second pseudo identity, and the second pseudo identity is one of the at least one first pseudo identity. The memory 1404 is configured to store code, and when the code is run by the processor 1403, the processor 1403 is configured to determine a second core network device corresponding to the second pseudo identity; and the transmitter 1401 is further configured to send the slice access request message to the second core network device.

The network slice allocation device provided in this application is the access network device in the network slice allocation system shown in FIG. 12. Implementation principles and technical effects of the network slice allocation device are similar to those of the access network device, and details are not repeated herein.

Figure 15:
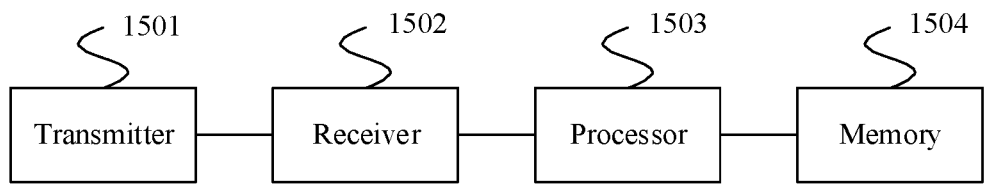
FIG. 15 is a schematic structural diagram of a network slice allocation device according to another embodiment of this application.

FIG. 15 is a schematic structural diagram of a network slice allocation device according to another embodiment of this application. As shown in FIG. 15, the device includes: a transmitter 1501, a receiver 1502, a processor 1503, and a memory 1504. The receiver 1502 is configured to receive at least one first pseudo identity sent by an access network device. Each first pseudo identity is a pseudo identity of a first core network device, and the first core network device is a core network device that previously allocated a network slice to the network slice allocation device. The memory 1504 is configured to store code, and when the code is run by the processor 1503, the processor 1503 is configured to: establish a mapping relationship between each first pseudo identity and at least one piece of NSSAI, and determine a second pseudo identity based on the mapping relationship and second NSSAI, where the second pseudo identity is one of the at least one first pseudo identity; the transmitter 1501 is further configured to send a slice access request message to the access network device, where the slice access request message includes the second pseudo identity, and the second pseudo identity is a pseudo identity of a second core network device; and the receiver 1502 is further configured to receive a security mode command sent by the second core network device. The transmitter 1501 is further configured to send a security mode complete command to the second core network device; and the transmitter 1501 is further configured to send the second NSSAI to the second core network device based on the security mode command.

The network slice allocation device provided in this application is the terminal device in the network slice allocation system shown in FIG. 12. Implementation principles and technical effects of the network slice allocation device are similar to those of the terminal device, and details are not repeated herein.

What is claimed is:

1. A network slice allocation system, comprising:
an access network device;
a second core network device; and
a terminal device,
wherein:
the access network device is further configured to receive a slice access request message from the terminal device, wherein the slice access request message comprises a second pseudo identity; determine the second core network device corresponding to the second pseudo identity, and send the slice access request message to the second core network device;
the second core network device is configured to send a security mode command to the terminal device, receive a security mode complete command sent by the terminal device, receive a second network slice selection assistance information (NSSAI) sent by the terminal device based on the security mode command, and allocate a network slice to the terminal device based on the slice access request message and the second NSSAI, and
wherein in response to the terminal device being in a visited network, at least one piece of first NSSAI comprising at least one piece of NSSAI in the visited network, and the second NSSAI comprising NSSAI in a home network of the terminal device, the terminal device is further configured to:
obtain at least one second mapping relationship, wherein each second mapping relationship comprises a correspondence between one piece of first NSSAI and one piece of third NSSAI, and the third NSSAI comprises NSSAI in the home network of the terminal device; and
determine a fourth NSSAI based on the second NSSAI and the at least one second mapping relationship, and determine the second pseudo identity based on the fourth NSSAI and the at least one first mapping relationship, wherein the fourth NSSAI comprises one of the at least one piece of first NSSAI.

2. The system according to claim 1, wherein a priority of a first core network device is higher than a first preset threshold or a priority of each piece of first NSSAI being higher than a second preset threshold.

3. The system according to claim 1, wherein the access network device is configured to broadcast the at least one first mapping relationship including a mapping relationship between a first pseudo identity and at least one piece of first NSSAI, and the first pseudo identity comprises a pseudo identity of a first core network device.

4. The system according to claim 3, wherein the at least one first mapping relationship is carried in a system information block (SIB).

5. The system according to claim 4, wherein the terminal device is configured to determine the second pseudo identity based on the second NSSAI and the at least one first mapping relationship, and send a slice access request message to the access network device.

6. A network slice allocation method, comprising:
receiving, by an access network device, a slice access request message sent by a terminal device, wherein the slice access request message comprises a second pseudo identity determined by the terminal device based on second network slice selection assistance information (NSSAI) and at least one first mapping relationship;
determining, by the access network device, a second core network device corresponding to the second pseudo identity; and
sending, by the access network device, the slice access request message to the second core network device,
wherein in response to the terminal device being in a visited network, at least one piece of first NSSAI comprising at least one piece of NSSAI in the visited network, and the second NSSAI comprising NSSAI in a home network of the terminal device, the method further comprises:
obtaining, by the terminal device, at least one second mapping relationship, wherein each second mapping relationship comprises a correspondence between one piece of first NSSAI and one piece of third NSSAI, and the third NSSAI comprises NSSAI in the home network of the terminal device; and
determining, by the terminal device, fourth NSSAI based on the second NSSAI and the at least one second mapping relationship; and
determining, by the terminal device, the second pseudo identity based on the fourth NSSAI and the at least one first mapping relationship, wherein the fourth NSSAI comprises one of the at least one piece of first NSSAI.

7. The network slice allocation method according to claim 6, further comprising:
broadcasting, by the access network device, the at least one first mapping relationship, wherein each first mapping relationship comprises a mapping relationship between a first pseudo identity of a first core network device and at least one piece of first NSSAI.

8. The network slice allocation method according to claim 7, further comprising: wherein the at least one first mapping relationship is carried in a system information block (SIB).

9. A network slice allocation method, comprising:
receiving, by a terminal device, at least one first mapping relationship, wherein each first mapping relationship is a mapping relationship between a first pseudo identity of a first core network device and at least one piece of first network slice selection assistance information (NSSAI);
determining, by the terminal device, a second pseudo identity of a second core network device based on second NSSAI and the at least one first mapping relationship;
sending, by the terminal device, a slice access request message to an access network device, wherein the slice access request message comprises the second pseudo identity;
receiving, by the terminal device, a security mode command sent by the second core network device;
sending, by the terminal device, a security mode complete command to the second core network device; and
sending, by the terminal device, the second NSSAI to the second core network device based on the security mode command,
wherein in response to the terminal device being in a visited network, the at least one piece of first NSSAI comprising at least one piece of NSSAI in the visited network, and the second NSSAI comprising NSSAI in a home network of the terminal device, and before the determining the second pseudo identity based on second NSSAI and the at least one first mapping relationship, the method further comprises:
obtaining, by the terminal device, at least one second mapping relationship, wherein each second mapping relationship is a correspondence between one piece of first NSSAI and one piece of third NSSAI, and the third NSSAI is NSSAI in the home network of the terminal device, and
wherein the determining the second pseudo identity based on second NSSAI and the at least one first mapping relationship comprises:
determining, by the terminal device, a fourth NSSAI based on the second NSSAI and the at least one second mapping relationship, wherein the fourth NSSAI comprises one of the at least one piece of first NSSAI; and
determining, by the terminal device, the second pseudo identity based on the fourth NSSAI and the at least one first mapping relationship.

10. The network slice allocation method according to claim 9, wherein a priority of a first core network device is higher than a first preset threshold or a priority of each piece of first NSSAI is higher than a second preset threshold.

11. The network slice allocation method according to claim 9, wherein the access network device broadcasts the at least one first mapping relationship including a mapping relationship between a first pseudo identity and at least one piece of first NSSAI, and the first pseudo identity comprises a pseudo identity of a first core network device.

12. The network slice allocation method according to claim 11, wherein the at least one first mapping relationship is carried in a system information block (SIB).

13. The network slice allocation method according to claim 12, further comprising:
determining, by the terminal device, the second pseudo identity based on the second NSSAI and the at least one first mapping relationship, and send a slice access request message to the access network device.

* * * * *